United States Patent
Dawkins et al.

(10) Patent No.: US 11,928,515 B2
(45) Date of Patent: Mar. 12, 2024

(54) SYSTEM AND METHOD FOR MANAGING RESOURCE ALLOCATIONS IN COMPOSED SYSTEMS

(71) Applicant: Dell Products L.P., Hopkinton, MA (US)

(72) Inventors: William Price Dawkins, Lakeway, TX (US); Mark Steven Sanders, Roanoke, VA (US); Jimmy Doyle Pike, Georgetown, TX (US); Elie Antoun Jreij, Pflugerville, TX (US); Robert Wayne Hormuth, Cedar Park, TX (US); Walter A. O'Brien, III, Westborough, MA (US); Mukund P. Khatri, Austin, TX (US); Gaurav Chawla, Austin, TX (US); Yossef Saad, Ganei Tikva (IL)

(73) Assignee: Dell Products L.P., Round Rock, TX (US)

( * ) Notice: Subject to any disclaimer, the term of this patent is extended or adjusted under 35 U.S.C. 154(b) by 372 days.

(21) Appl. No.: 17/116,777

(22) Filed: Dec. 9, 2020

(65) Prior Publication Data

US 2022/0179695 A1 Jun. 9, 2022

(51) Int. Cl.
*G06F 9/50* (2006.01)
*G06F 11/30* (2006.01)
*G06F 11/34* (2006.01)

(52) U.S. Cl.
CPC .......... *G06F 9/505* (2013.01); *G06F 11/3024* (2013.01); *G06F 11/3495* (2013.01)

(58) Field of Classification Search
CPC .. G06F 9/505; G06F 11/3024; G06F 11/3495; G06F 11/3062; G06F 9/5027;
(Continued)

(56) References Cited

U.S. PATENT DOCUMENTS 7,478,117 B1   1/2009  Lamb et al.
7,606,892 B2  10/2009  Piet et al.
(Continued)

FOREIGN PATENT DOCUMENTS

WO   2007120772 A2   10/2007

OTHER PUBLICATIONS

Mohammadi et al, "Towards an End-to-End Architecture for Runtime Data Protection in the Cloud", 2018 44th Euromicro Conference on Software Engineering and Advanced Applications (SEAA), IEEE, pp. 514-518. (Year: 2018).

(Continued)

*Primary Examiner* — Jorge A Chu Joy-Davila
(74) *Attorney, Agent, or Firm* — Chamberlain, Hrdlicka, White, Williams & Aughtry; Aly Z. Dossa

(57) ABSTRACT

A system for providing computer implemented services using information handling systems includes persistent storage and a system control processor manager. The system control processor manager instantiates composed information handling systems using the information handling systems; monitors, using system control processors of the composed information handling systems, operation of the composed information handling systems to obtain operation information; makes a determination, based on the operation information, that the computing implemented services provided by the composed information handling systems are substandard; and in response to the determination: manages operation of the composed information handling systems to provide standards compliant computer implemented services by modifying a composition of at least one of the composed information handling systems using a system control processor of the system control processors.

18 Claims, 14 Drawing Sheets

(58) Field of Classification Search
CPC ... G06F 9/5077; G06F 11/3409; G06F 9/5083
See application file for complete search history.

(56) References Cited

U.S. PATENT DOCUMENTS

| | | | |
|---|---|---|---|
| 7,620,984 | B2 | 11/2009 | Kallahalla |
| 8,095,929 | B1* | 1/2012 | Ji .................... G06F 9/45558 |
| | | | 718/1 |
| 8,266,636 | B2 | 9/2012 | Kharat et al. |
| 8,276,140 | B1 | 9/2012 | Beda, III et al. |
| 8,285,747 | B1 | 10/2012 | English |
| 8,306,948 | B2 | 11/2012 | Chou |
| 8,499,066 | B1 | 7/2013 | Zhang et al. |
| 8,589,659 | B1 | 11/2013 | Shapiro |
| 8,606,920 | B1 | 12/2013 | Gupta et al. |
| 8,751,546 | B1 | 6/2014 | Grieve |
| 8,997,242 | B2 | 3/2015 | Chen |
| 9,104,844 | B2 | 8/2015 | Fang |
| 9,105,178 | B2 | 8/2015 | Carlson |
| 9,245,096 | B2 | 1/2016 | Abuelsaad |
| 9,413,819 | B1 | 8/2016 | Berg et al. |
| 9,529,689 | B2 | 12/2016 | Ferris et al. |
| 9,569,598 | B2 | 2/2017 | Abuelsaad |
| 9,600,553 | B1 | 3/2017 | Nigade et al. |
| 9,613,147 | B2 | 4/2017 | Carlson |
| 9,678,977 | B1 | 6/2017 | Aronovich |
| 9,923,785 | B1* | 3/2018 | Li .......................... H04L 41/40 |
| 9,959,140 | B2 | 5/2018 | Jackson |
| 10,097,438 | B2 | 10/2018 | Ferris et al. |
| 10,348,574 | B2 | 7/2019 | Kulkarni |
| 10,382,279 | B2 | 8/2019 | Roese |
| 10,601,903 | B2 | 3/2020 | Bivens |
| 10,628,225 | B2 | 4/2020 | Yamato |
| 10,754,741 | B1 | 8/2020 | Sethuramalingam et al. |
| 10,756,990 | B1 | 8/2020 | Chakkassery Vidyadharan et al. |
| 10,782,882 | B1 | 9/2020 | Wu |
| 10,795,856 | B1 | 10/2020 | Smith et al. |
| 10,848,408 | B2 | 11/2020 | Uriel |
| 10,860,380 | B1* | 12/2020 | Kowalski ............ G06F 13/10 |
| 10,909,072 | B2 | 2/2021 | Sun et al. |
| 10,909,283 | B1 | 2/2021 | Wang et al. |
| 10,994,198 | B1 | 5/2021 | Byskal et al. |
| 11,119,739 | B1 | 9/2021 | Allen et al. |
| 11,134,013 | B1 | 9/2021 | Allen et al. |
| 11,221,886 | B2 | 1/2022 | Bivens et al. |
| 11,308,234 | B1 | 4/2022 | Stapleton |
| 11,537,421 | B1 | 12/2022 | Brooker et al. |
| 11,616,686 | B1 | 3/2023 | Chandrachood et al. |
| 2003/0028642 | A1 | 2/2003 | Agarwal et al. |
| 2003/0061262 | A1 | 3/2003 | Hahn et al. |
| 2003/0233427 | A1 | 12/2003 | Taguchi |
| 2004/0257998 | A1 | 12/2004 | Chu et al. |
| 2006/0082222 | A1 | 4/2006 | Pincu et al. |
| 2006/0089951 | A1 | 4/2006 | Factor et al. |
| 2006/0161884 | A1* | 7/2006 | Lubrecht ............ G06F 11/3442 |
| | | | 717/104 |
| 2006/0230407 | A1* | 10/2006 | Rosu .................... G06F 9/45558 |
| | | | 718/105 |
| 2006/0236100 | A1 | 10/2006 | Baskaran et al. |
| 2008/0052480 | A1 | 2/2008 | Satoyama et al. |
| 2008/0313476 | A1 | 12/2008 | Hansen |
| 2009/0199193 | A1 | 8/2009 | Jackson |
| 2009/0282404 | A1 | 11/2009 | Khandekar et al. |
| 2010/0138656 | A1 | 6/2010 | Chinen et al. |
| 2010/0217865 | A1 | 8/2010 | Ferris |
| 2011/0055378 | A1 | 3/2011 | Ferris et al. |
| 2011/0099147 | A1 | 4/2011 | Mcalister et al. |
| 2011/0154500 | A1 | 6/2011 | Sahita et al. |
| 2011/0258248 | A1 | 10/2011 | Jackson |
| 2011/0307570 | A1 | 12/2011 | Speks |
| 2012/0047328 | A1 | 2/2012 | Williams et al. |
| 2012/0131161 | A1* | 5/2012 | Ferris .................. G06Q 30/02 |
| | | | 709/223 |
| 2012/0221314 | A1 | 8/2012 | Bourlatchkov et al. |
| 2012/0222084 | A1 | 8/2012 | Beaty et al. |
| 2013/0007710 | A1 | 1/2013 | Vedula et al. |
| 2013/0311434 | A1 | 11/2013 | Jones |
| 2013/0332901 | A1 | 12/2013 | Berg et al. |
| 2013/0346718 | A1 | 12/2013 | Meshchaninov et al. |
| 2014/0007097 | A1 | 1/2014 | Chin et al. |
| 2014/0149635 | A1* | 5/2014 | Bacher ................ G06F 9/45533 |
| | | | 718/1 |
| 2014/0165063 | A1 | 6/2014 | Shiva et al. |
| 2014/0223233 | A1 | 8/2014 | Heyrman et al. |
| 2014/0279884 | A1 | 9/2014 | Dantkale et al. |
| 2014/0282820 | A1 | 9/2014 | Walton et al. |
| 2014/0358972 | A1 | 12/2014 | Guarrieri et al. |
| 2014/0359356 | A1 | 12/2014 | Aoki |
| 2015/0106165 | A1 | 4/2015 | Rai et al. |
| 2015/0178128 | A1 | 6/2015 | Knowles et al. |
| 2015/0220455 | A1 | 8/2015 | Chen et al. |
| 2015/0281336 | A1 | 10/2015 | Beale |
| 2015/0317173 | A1 | 11/2015 | Anglin |
| 2015/0381426 | A1 | 12/2015 | Roese et al. |
| 2016/0062441 | A1 | 3/2016 | Chou et al. |
| 2016/0103698 | A1 | 4/2016 | Yang et al. |
| 2016/0180087 | A1 | 6/2016 | Edwards et al. |
| 2016/0224903 | A1 | 8/2016 | Talathi et al. |
| 2016/0259665 | A1 | 9/2016 | Gaurav et al. |
| 2017/0031622 | A1 | 2/2017 | Nagarajan et al. |
| 2017/0034012 | A1 | 2/2017 | Douglas et al. |
| 2017/0041184 | A1 | 2/2017 | Broz et al. |
| 2017/0048200 | A1 | 2/2017 | Chastain |
| 2017/0097851 | A1 | 4/2017 | Chen |
| 2017/0118247 | A1 | 4/2017 | Hussain |
| 2017/0195201 | A1 | 7/2017 | Mueller et al. |
| 2017/0201574 | A1 | 7/2017 | Luo |
| 2017/0295107 | A1 | 10/2017 | Salapura et al. |
| 2018/0024964 | A1 | 1/2018 | Mao |
| 2018/0026905 | A1 | 1/2018 | Balle et al. |
| 2018/0063145 | A1 | 3/2018 | Cayton et al. |
| 2018/0074816 | A1 | 3/2018 | Moss et al. |
| 2018/0157429 | A1 | 6/2018 | Venkat et al. |
| 2018/0351836 | A1 | 12/2018 | Guim Bernat et al. |
| 2019/0014193 | A1 | 1/2019 | Guim Bernat et al. |
| 2019/0065061 | A1 | 2/2019 | Kim et al. |
| 2019/0065256 | A1* | 2/2019 | Hamilton ............ G06F 9/5066 |
| 2019/0079837 | A1 | 3/2019 | Agarwal et al. |
| 2019/0164087 | A1 | 5/2019 | Ghibril et al. |
| 2019/0188014 | A1 | 6/2019 | Easterling et al. |
| 2019/0190778 | A1 | 6/2019 | Easterling et al. |
| 2019/0205180 | A1 | 7/2019 | Macha et al. |
| 2019/0227616 | A1 | 7/2019 | Jenne et al. |
| 2019/0281373 | A1 | 9/2019 | Sadasivarao et al. |
| 2019/0324808 | A1 | 10/2019 | Krishnan et al. |
| 2019/0334774 | A1 | 10/2019 | Bennett et al. |
| 2019/0356729 | A1 | 11/2019 | Bivens et al. |
| 2019/0356731 | A1 | 11/2019 | Bivens et al. |
| 2019/0384516 | A1 | 12/2019 | Bernat |
| 2019/0384648 | A1 | 12/2019 | Wiggers et al. |
| 2019/0386902 | A1 | 12/2019 | Mueller et al. |
| 2020/0026564 | A1 | 1/2020 | Bahramshahry et al. |
| 2020/0028854 | A1 | 1/2020 | Fabrizi et al. |
| 2020/0034221 | A1 | 1/2020 | Ganesan et al. |
| 2020/0034528 | A1 | 1/2020 | Yang et al. |
| 2020/0044966 | A1 | 2/2020 | Krishnan et al. |
| 2020/0045116 | A1 | 2/2020 | Deodhar et al. |
| 2020/0065254 | A1 | 2/2020 | Cao et al. |
| 2020/0097358 | A1 | 3/2020 | Mahindru et al. |
| 2020/0110639 | A1 | 4/2020 | Corsi et al. |
| 2020/0174949 | A1 | 6/2020 | Ramasamy et al. |
| 2020/0218561 | A1 | 7/2020 | Lal et al. |
| 2020/0233582 | A1 | 7/2020 | Chen et al. |
| 2020/0241798 | A1 | 7/2020 | Kanno |
| 2020/0264998 | A1 | 8/2020 | Long et al. |
| 2020/0285502 | A1 | 9/2020 | Hildebrand et al. |
| 2020/0293375 | A1 | 9/2020 | Klein |
| 2020/0341786 | A1 | 10/2020 | Soryal |
| 2020/0341798 | A1 | 10/2020 | Duleba |
| 2020/0351221 | A1 | 11/2020 | Subramani et al. |
| 2020/0351347 | A1 | 11/2020 | Chang et al. |
| 2020/0356200 | A1 | 11/2020 | Blanco et al. |
| 2020/0358714 | A1 | 11/2020 | Singleton, IV et al. |
| 2021/0019062 | A1 | 1/2021 | Fessel |

(56) References Cited

U.S. PATENT DOCUMENTS

| | | | |
|---|---|---|---|
| 2021/0019162 A1* | 1/2021 | Viswanathan | G06F 9/5033 |
| 2021/0037466 A1 | 2/2021 | Silva et al. | |
| 2021/0111942 A1 | 4/2021 | Tahhan et al. | |
| 2021/0117389 A1 | 4/2021 | Cui et al. | |
| 2021/0117441 A1 | 4/2021 | Patel et al. | |
| 2021/0152659 A1 | 5/2021 | Cai et al. | |
| 2021/0224093 A1 | 7/2021 | Fu et al. | |
| 2021/0233532 A1 | 7/2021 | Kudurshian et al. | |
| 2021/0250220 A1 | 8/2021 | Yang et al. | |
| 2021/0286667 A1 | 9/2021 | Yigzaw et al. | |
| 2021/0367901 A1 | 11/2021 | Singh et al. | |
| 2021/0383020 A1 | 12/2021 | Sofia et al. | |
| 2021/0397494 A1 | 12/2021 | Graham | |
| 2022/0179701 A1 | 6/2022 | Saad et al. | |
| 2022/0182288 A1 | 6/2022 | Vaikar et al. | |
| 2022/0191253 A1 | 6/2022 | Rungta et al. | |
| 2022/0197773 A1 | 6/2022 | Butler et al. | |
| 2022/0342649 A1 | 10/2022 | Cao et al. | |
| 2023/0026690 A1 | 1/2023 | Dawkins et al. | |
| 2023/0033296 A1 | 2/2023 | Shetty et al. | |
| 2023/0093900 A1 | 3/2023 | Scope et al. | |
| 2023/0237204 A1 | 7/2023 | Khatri et al. | |

OTHER PUBLICATIONS

Alachiotis, Nikolaos, et al. "dReDBox: A Disaggregated Architectural Perspective for Data Centers", Hardware Accelerators in Data Centers; Springer International Publishing AG, pp. 35-56. (Year: 2019).

Anonymous: "Dell Chassis Management Controller Version 6.20 for PowerEdge M1000e" Dec. 3, 2018 (Dec. 3, 2018) 274 pages, Retrieved from the Internet: URL:https://dl/del/com/topicspdf/dell-chassis-management-controller-v620-poweredge-m1000e_users-guide_en-us.pdf.

International Searching Authority, International Search Report and Written Opinion dated Oct. 21, 2021 for corresponding PCT Application No. PCTUS2021029708 filed Apr. 28, 2021.

International Searching Authority, International Search Report and Written Opinion for corresponding PCT Application No. PCTUS2021029702 filed Apr. 28, 2021, dated Aug. 19, 2021, 13 pages.

International Searching Authority, International Search Report and Written Opinion dated Jul. 19, 2021, Issued in corresponding PCT Application No. PCT/US2021/029687, 11 pages.

International Searching Authority, International Search Report and Written Opinion of corresponding PCT Application No. PCT/US2021/029698, dated Aug. 9, 2021, 15 pages.

Chunlin, Li, Tang Jianhang, and Luo Youlong, Hybrid cloud adaptive scheduling strategy for heterogeneous workloads, Hybrid cloud adaptive scheduling strategy for heterogeneous workloads, Year: 2019, pp. 419-446, Journal of Grid Computing 17 (28 pages).

Francesco Paolucci, Andrea Sgambelluri, Telemetry in Disaggregated Optical Networks, International Conference on Optical Network Design and Modeling, Year: 2020 (3 pages).

Marcio Barbosa De Carvalho et al., A Cloud Monitoring Framework for Self-Configured Monitoring Slices Based on Multiple Tools, Year: 2013, pp. 180-184 (5 pages).

Peter X. Gao et al., Network Requirements for Resource Disaggregation, USENIX The Advanced Computing Systems Association, Year: 2016, pp. 249-264 (17 pages).

Rui Lin et al., Disaggregated Data Centers: Challenges and Tradeoffs, Year: 2020, (7 pages).

* cited by examiner

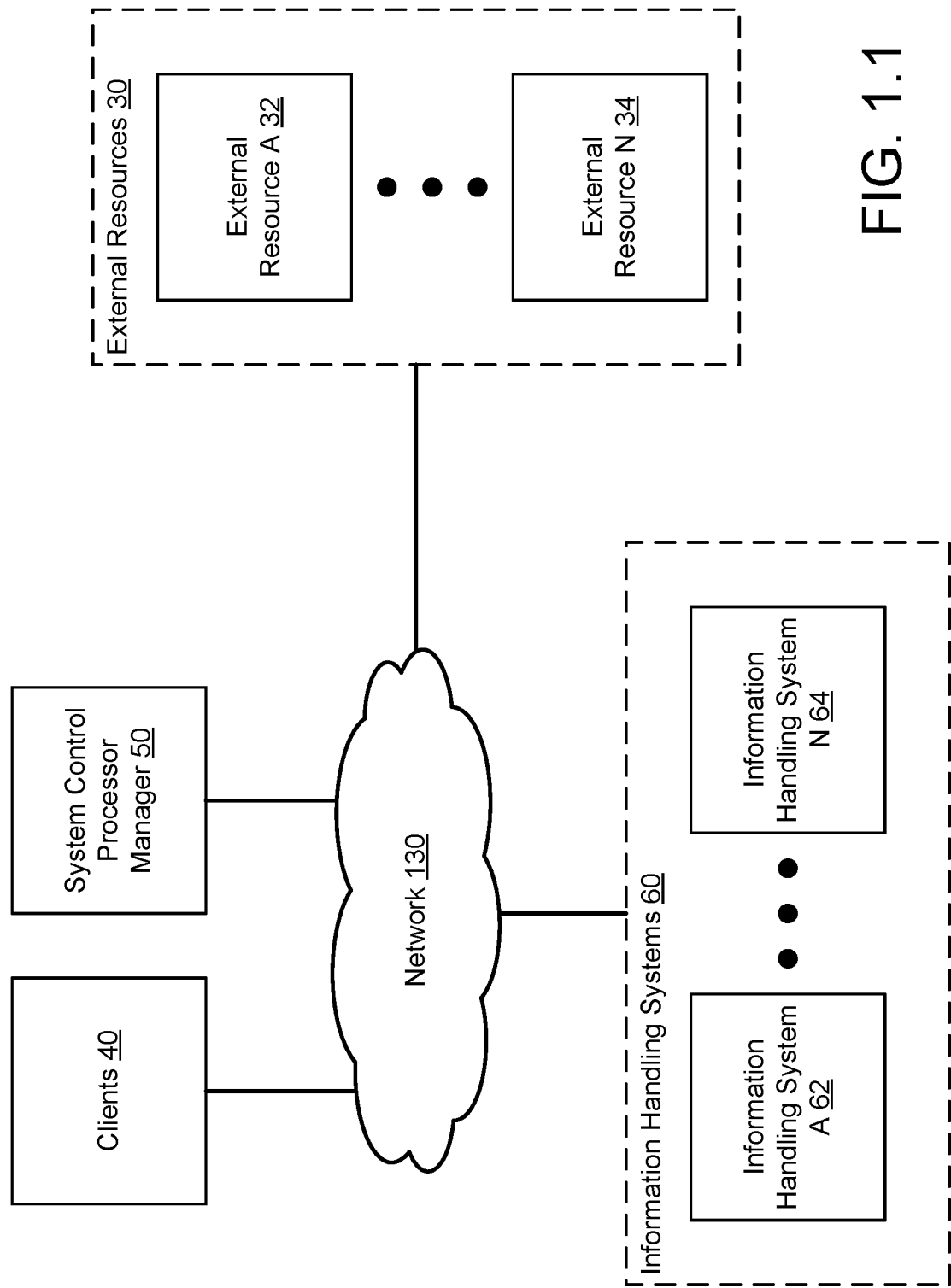
FIG. 1.1

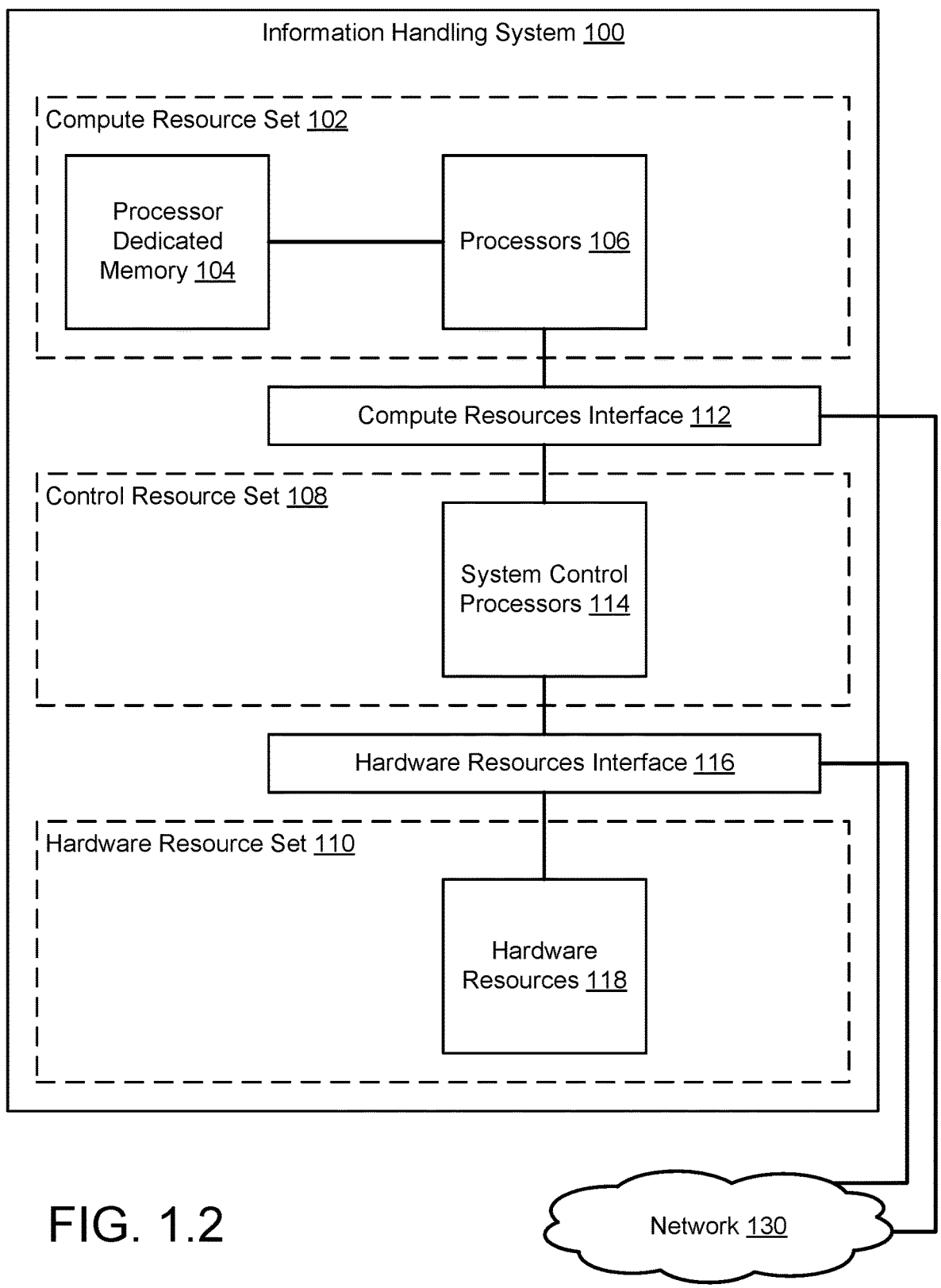
FIG. 1.2

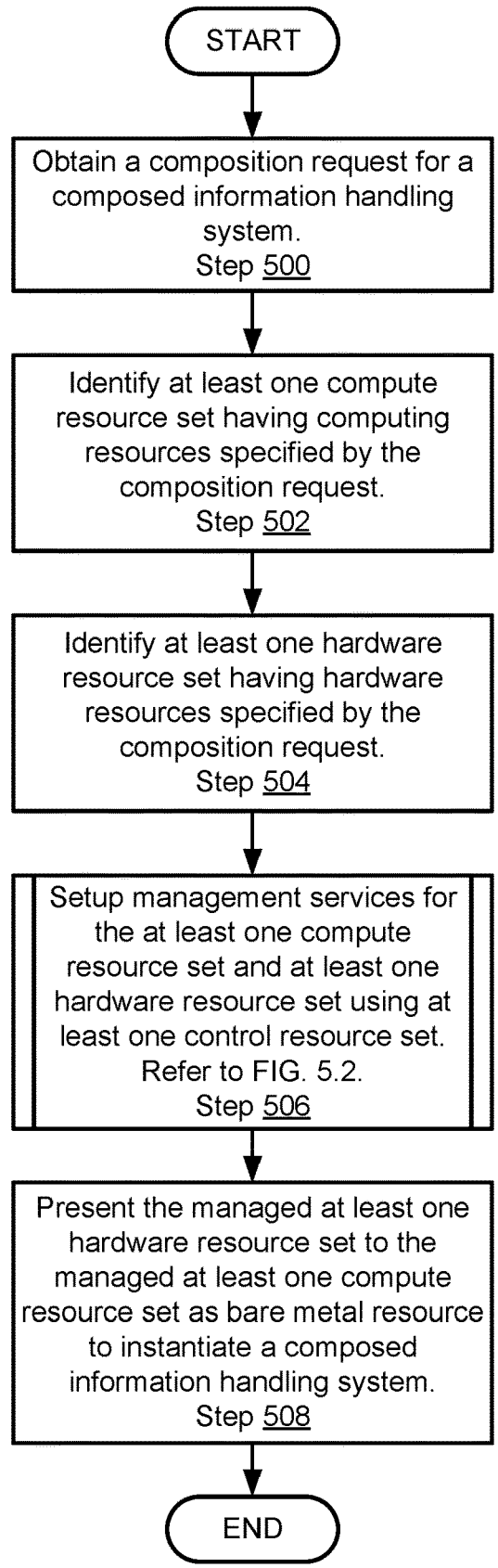
FIG. 5.1

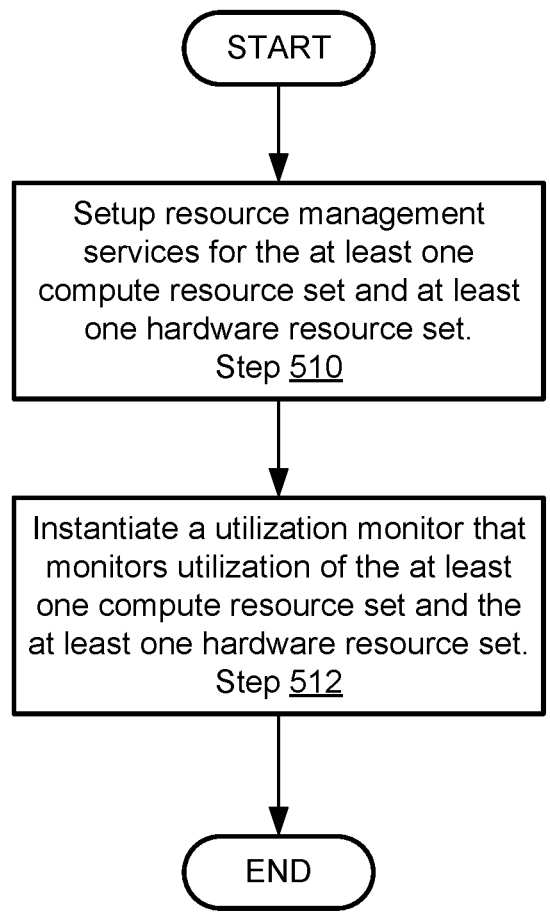
FIG. 5.2

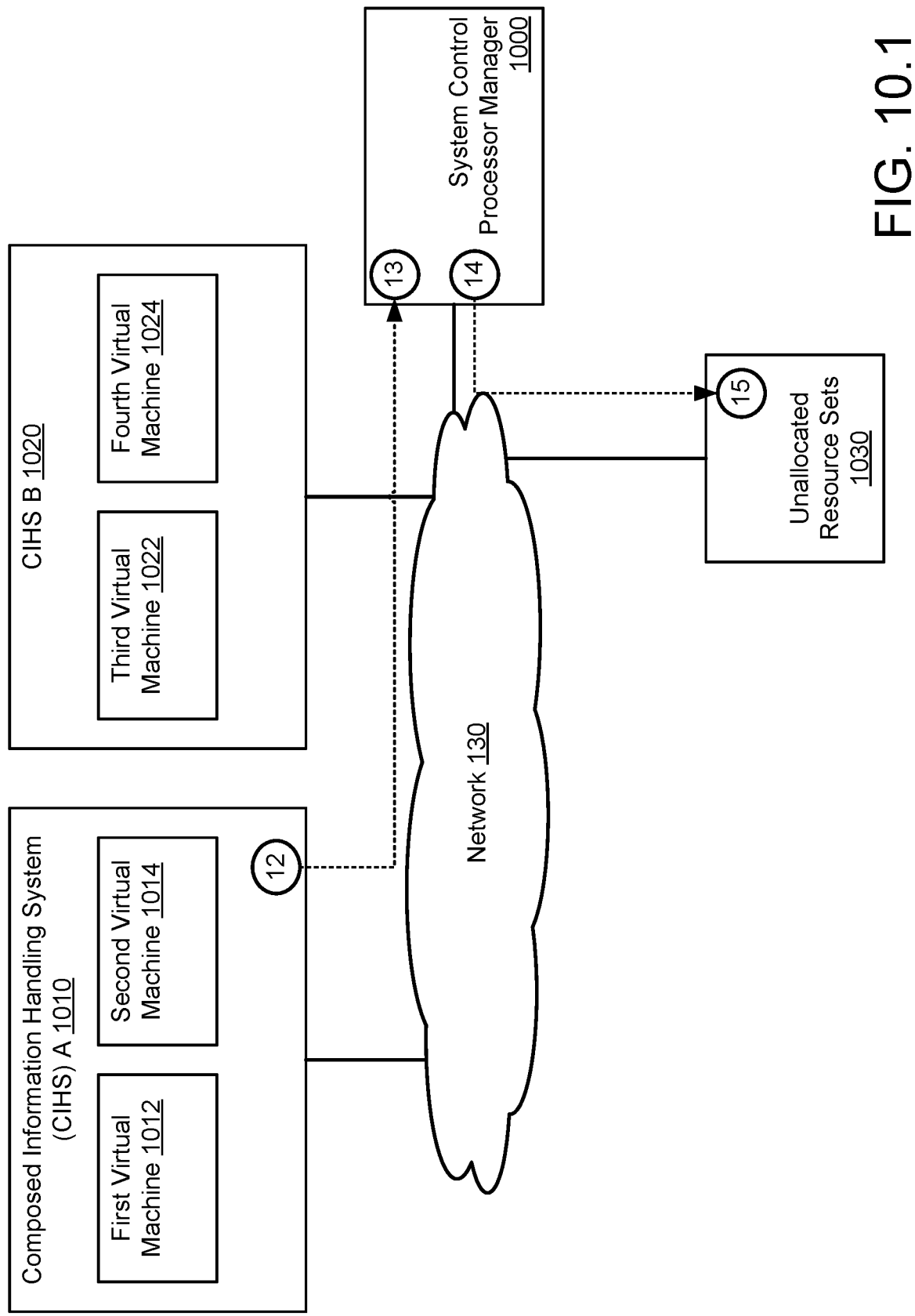
FIG. 10.1

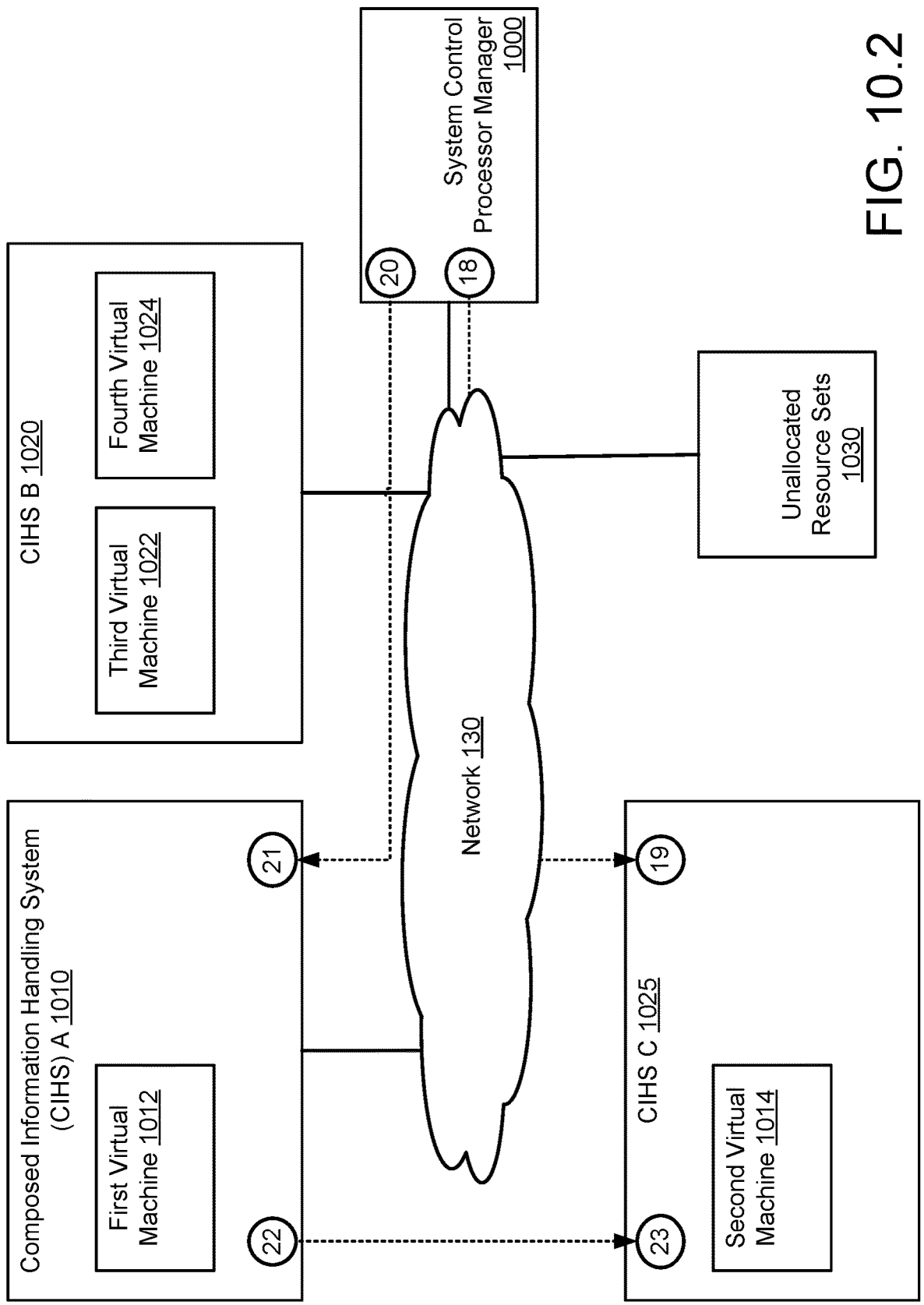
FIG. 10.2

SYSTEM AND METHOD FOR MANAGING RESOURCE ALLOCATIONS IN COMPOSED SYSTEMS

BACKGROUND

Computing devices may provide services. To provide the services, the computing devices may include hardware components and software components. The services provided by the computing devices may be limited by these components.

SUMMARY

In one aspect, a system for providing computer implemented services using information handling systems in accordance with one or more embodiments of the invention includes persistent storage and a system control processor manager. The system control processor manager instantiates composed information handling systems using the information handling systems; monitors, using system control processors of the composed information handling systems, operation of the composed information handling systems to obtain operation information; makes a determination, based on the operation information, that the computing implemented services provided by the composed information handling systems are substandard; and in response to the determination: manages operation of the composed information handling systems to provide standards compliant computer implemented services by modifying a composition of at least one of the composed information handling systems using a system control processor of the system control processors.

In one aspect, a method for providing computer implemented services using information handling systems in accordance with one or more embodiments of the invention includes instantiating composed information handling systems using the information handling systems; monitoring, using system control processors of the composed information handling systems, operation of the composed information handling systems to obtain operation information; making a determination, based on the operation information, that the computing implemented services provided by the composed information handling systems are substandard; and in response to the determination: managing operation of the composed information handling systems to provide standards compliant computer implemented services by modifying a composition of at least one of the composed information handling systems using a system control processor of the system control processors.

In one aspect, a non-transitory computer readable medium in accordance with one or more embodiments of the invention includes computer readable program code, which when executed by a computer processor enables the computer processor to perform a method for providing computer implemented services using information handling systems. The method includes instantiating composed information handling systems using the information handling systems; monitoring, using system control processors of the composed information handling systems, operation of the composed information handling systems to obtain operation information; making a determination, based on the operation information, that the computing implemented services provided by the composed information handling systems are substandard; and in response to the determination: managing operation of the composed information handling systems to provide standards compliant computer implemented services by modifying a composition of at least one of the composed information handling systems using a system control processor of the system control processors.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an information handling system in accordance with one or more embodiments of the invention.

FIG. 5.1 shows a flowchart of a method of instantiating a composed information handling system based on a composition request in accordance with one or more embodiments of the invention.

FIG. 5.2 shows a flowchart of a method of setting up management services in accordance with one or more embodiments of the invention.

FIGS. 10.1-10.2 show diagrams of the operation of a second example system over time in accordance with one or more embodiments of the invention.

DETAILED DESCRIPTION

Figure 2:
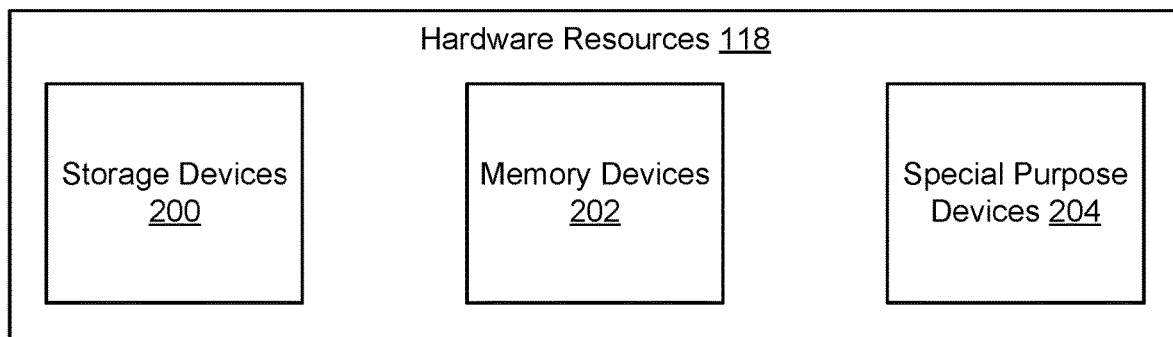
FIG. 2 shows a diagram of hardware resources in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for providing computer implemented services. To provide computer implemented services, computing resources may need to be allocated for the performance of the services. The services may include, for example, processing resources, memory, resources, storage resources, computing resources, etc.

To allocate the computing resources, composed information handling systems may be instantiated. A composed information handling system may be a device (the components of which may be distributed across one or more information handling systems) that has exclusive use over a quantity of computing resources. Computing resources from multiple information handling systems may be allocated to a composed information handling system thereby enabling a composed information handling system to utilize computing resources from any number of information handling system for performance of corresponding computer implemented services.

To allocate computing resources, the system may include a system control processor manager. The system control processor manager may obtain composition requests and/or recomposition requests. These requests may indicate a desired outcome such as, for example, execution of one or more application, providing of one or more services, etc. The system control processor manager may translate these requests into corresponding quantities of computing resources necessary to be allocated to satisfy the intent of the composition requests.

Once the quantities of computing resources are obtained, the system control processor manager may allocate resources of the information handling system to meet the identified quantities of computing resources by instructing system control processors of the information handling systems to prepare and present hardware resource sets of the information handling systems to compute resource sets of the information handling systems (e.g., thereby forming an operable computing device).

Once a composed information handling system is instantiated, the use of the computing resources allocated to the composed information handling system may be monitored. The use of the computing resources may be monitored using system control processors that mediate the presentations and connection of resources of the composed information handling system. The presence and operation of the system control processor may be unknown to entities executing using the composed information handling system. Consequently, these entities may not be able to, intentionally or unintentionally, interfere with, limit, or otherwise modify the collected computing resource use information.

By monitoring the use of computing resources, it may be determined whether composed information handling systems and/or deployments constructed from these systems should be recomposed. Recomposing a composed information handling system or deployment may change the quantity of computing resources available to provide computer implemented services. Consequently, by recomposing systems, the quality of the provided computer implemented services may be managed to meet client expectations.

Accordingly, phantom slow downs or other performance hiccups that may degrade a quality of a user's experience of the computer implemented services may be improved. Additionally, by recomposing systems, under-utilized resources may be freed for reallocation to other systems. Consequently, the efficiency of computing resource use may be improved.

FIG. 1.1 shows a system in accordance with one or more embodiments of the invention. The system may include any number of information handling systems (60). The information handling systems (60) may provide computer implemented services. The computer implemented services may include, for example, database services, data storage services, electronic communications services, data protection services, and/or other types of services that may be implemented using information handling systems.

The information handling system of the system of FIG. 1.1 may operate independently and/or cooperatively to provide the computer implemented services. For example, a single information handling system (e.g., 62) may provide a computer implemented service on its own (i.e., independently) while multiple other information handling systems (e.g., 62, 64) may provide a second computer implemented service cooperatively (e.g., each of the multiple other information handling systems may provide similar and or different services that form the cooperatively provided service).

To provide computer implemented services, the information handling systems (60) may utilize computing resources provided by hardware devices. The computing resources may include, for example, processing resources, storage resources, memory resources, graphics processing resources, communications resources, and/or other types of resources provided by the hardware devices. Various hardware devices may provide these computing resources.

The type and quantity of computing resources required to provide computer implemented services may vary depending on the type and quantity of computer implemented services to be provided. For example, some types of computer implemented services may be more compute intensive (e.g., modeling) while other computer implemented services may be more storage intensive (e.g., database) thereby having different computing resource requirements for these different services. Consequently, computing resources may be used inefficiently if the quantity of computing resources is over-allocated for the computer implemented services. Similarly, the quality of the provided computer implemented services may be poor or otherwise undesirable if computing resources are under-allocated for the computer implemented services.

Clients (40) may request that the computer implemented services be provided. For example, the clients (40) may send requests to management entities to have the computer implemented services be provided.

In general, embodiments of the invention relate to system, methods, and devices for managing the hardware resources of the information handling systems (60) and/or other resources (e.g., external resources (30)) to provide computer implemented services. The hardware resources of the information handling systems (60) may be managed by instantiating one or more composed information handling systems using the hardware resources of the information handling systems (60), external resources (30), and/or other types of hardware devices operably connected to the information handling systems (60). Consequently, the computing resources allocated to a composed information handling system may be tailored to the specific needs of the services that will be provided by the composed information handling system.

Overtime, the quantity of computing resources necessary to provide the computer implemented services may change. In such scenarios, the resource allocations for providing the services may be modified. For example, additional resources may be added to existing composed information handling systems (e.g., when over-loaded), resources may be removed from existing composed information handling systems (e.g., when under-loaded), and/or new composed information handling systems may be instantiated so that some of the existing workloads hosted by composed information handling systems can be transferred to the new composed information handling systems. By doing so, embodiments of the invention may improve the likelihood that computer implemented services are provided in a manner that meets the expectations of the clients (40).

In one or more embodiments of the invention, the system includes a system control processor manager (50). The system control processor manager (50) may provide composed information handling system composition services. Composed information handling system composition services may include (i) obtaining composition requests for composed information handling systems from, for example, the clients (40), (ii) aggregating computing resources from the information handling systems (60) and/or external resources (30) using system control processors to service the composition requests by instantiating composed information handling systems in accordance with the requests, and (iii) modifying existing resource allocations for composed information handling systems. By doing so, instantiated composed information handling systems may provide computer implemented services in accordance with the expectations of the clients.

To determine whether to modify resource allocations, the system control processor manager (50) may monitor, for example, the workloads being performed by composed information handling systems, the utilization of computing resources allocated to the composed information handling systems, and/or other characteristics of the composed systems that may indicate whether the composed information handling systems are able to provide computer implemented services that meet the expectations of the clients (40). For example, clients (40) may utilize Service Level Agreements (SLAs) or other types of quantification metrics for ascertaining whether services that have been requested to be provided meet those promised to be provided.

If the system control processor manager (50) determines, based on the monitoring, that the computer implemented services will not meet the expectations of the clients (40), then the system control processor manager (50) may reallocation computing resources to composed information handling systems and/or instantiate new composed information handling systems to assist in providing the computer implemented services. By doing so, the computer implemented services provided by the composed information handling systems may be more likely to meet the expectations of the clients (40).

To determine how to address computer implemented services that will not meet client expectations, the system control processor manager (50) may maintain information regarding the resources that may be allocated and take into account the resource cost for reallocation these resources. For example, transferring a workload to a newly instantiated composed information handling system may be computationally costly. Consequently, doing so may not be able to improve the quality of computer implemented services in all situations. By taking into account the resource cost for reallocating resources, a system in accordance with embodiments of the invention may be less likely to invest resources in reallocating resources when the reallocation of resources is unlikely to cause the computer implemented services provided using the reallocated resources to meet the expectations of the clients (40).

To determine the utilization of the computing resources of the information handling systems (60), performance of workloads, or other indicators regarding the quality of computer implemented services provided by composed information handling systems, the system control processor manager (50) may instruct system control processors of the composed information handling systems to monitor the use of hardware resources by the clients (40). This information may be used, for example, to ascertain whether additional or fewer resources should be allocated to the composed information handling systems, to identify whether new composed information handling systems should be instantiated, and/or for other purposes.

In one or more embodiments of the invention, the system control processor manager (50) instantiates composed information handling systems in accordance with a three resource set model. As will be discussed in greater detail below, the computing resources of an information handling system may be divided into three logical resource sets: a compute resource set, a control resource set, and a hardware resource set. Different resource sets, or portions thereof, from the same or different information handling systems may be aggregated (e.g., caused to operate as a computing device) to instantiate a composed information handling system having at least one resource set from each set of the three resource set model.

By logically dividing the computing resources of an information handling system into these resource sets, different quantities and types of computing resources may be allocated to each composed information handling system thereby enabling the resources allocated to the respective information handling system to match performed workloads. Further, dividing the computing resources in accordance with the three set model may enable different resource sets to be differentiated (e.g., given different personalities) to provide different functionalities. Consequently, composed information handling systems may be composed on the basis of desired functionalities rather than just on the basis of aggregate resources to be included in the composed information handling system.

Additionally, by composing composed information handling systems in this manner, the control resource set of each composed information handling system may be used to consistently deploy management services across any number of composed information handling systems. Consequently, embodiments of the invention may provide a framework for unified security, manageability, resource management/composability, workload management, and distributed system management by use of this three resource set model. For example, utilization monitors may be deployed in control resource sets to monitor the use of the other resource sets. Accordingly, use of these computing resources for providing computer implemented services requested by the clients (40) may be uniformly monitored across the information handling systems (60). For additional details regarding the system control processor manager (50), refer to FIG. 4.

In one or more embodiments of the invention, a composed information handling system is a device that is formed using all, or a portion, of the computing resources of the information handling systems (60), the external resources (30), and/or other types of hardware devices operably connected to the information handling systems (60). The composed information handling system may utilize the computing resources allocated to it to provide computer implemented services. For example, the composed information handling system may host one or more applications that utilize the computing resources assigned to the composed information handling system. The applications may provide the computer implemented services. Thus, the quality of the computer implemented services may be limited based on the allocation of computing resources to the composed information handling systems.

To instantiate composed information handling systems, the information handling systems (60) may include at least three resource sets including a control resource set. The control resource set may include a system control processor. The system control processor of each information handling system may coordinate with the system control processor manager (50) to enable composed information handling systems to be instantiated. For example, the system control processor of an information handling system may provide telemetry data regarding the computing resources of an information handling system, may perform actions on behalf of the system control processor manager (50) to aggregate computing resources together, may monitor the utilization of computing resources for providing computer implemented services requested by the clients (40), and/or may provide services that unify the operation of composed information handling systems.

In one or more embodiments of the invention, compute resource sets of composed information handling systems are presented with bare metal resources by control resource sets even when the presented resources are actually being managed using one or more layers of abstraction, emulation, virtualization, security model, etc. For example, the system control processors of the control resource sets may provide the abstraction, emulation, virtualization, and/or other services while presenting the resources as bare metal resources. Consequently, these services may be transparent to applications hosted by the compute resource sets of composed information handling systems thereby enabling uniform deployment of such services without requiring implementation of control plane entities hosted by the compute resource sets of the composed information handling systems. Accordingly, by utilizing system control processors to monitor the use of the computing resources of a composed information handling system, applications or other entities hosted by the composed information handling system may not be able to view, be aware, impact, or otherwise influence the collection of computing resource use data. Accordingly, relevant information that may be used to decide how to allocate computing resources may be obtain in a manner that is transparent to the composed information handling systems. For additional details regarding the information handling systems (60), refer to FIG. 1.2.

The external resources (30) may provide computing resources that may be allocated for use by composed information handling systems. For example, the external resources (30) may include hardware devices that provide any number and type of computing resources. The composed information handling system may use these resources to provide their functionalities. For example, system control processors may operably connect to and manage the external resources (30) to provide additional and/or different computing resources from those available to be provided only using hardware resource sets of information handling systems. By utilizing system control processors to manage these resources, the use of these external resources (30) for providing services requested by the clients (40) may also be efficiently and transparently monitored.

Different external resources (e.g., 32, 34) may provide similar or different computing resources. For example, some external resources may include large numbers of hard disk drives to provide storage resources while other may include graphics processing unit rendering farms. The external resources (30) may include any number and type of computing resources for allocation to composed information handling systems via system control processors of control resource sets.

The system of FIG. 1.1 may include any number of information handling systems (e.g., 62, 64), any number of external resources (e.g., 32, 34), and any number of system control processor managers (e.g., 50). Any of the components of FIG. 1.1 may be operably connected to any other component and/or other components not illustrated in FIG. 1.1 via one or more networks (e.g., 130). The networks may be implemented using any combination of wired and/or wireless network topologies.

The clients (40), system control processor manager (50), information handling systems (60), and/or external resources (30) may be implemented using computing devices. The computing devices may include, for example, a server, laptop computer, a desktop computer, a node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor manager (50), information handling systems (60), and/or external resources (30) described in this application and/or all, or a portion, of the methods illustrated in FIGS. 5.1-8. The clients (40), system control processor manager (50), information handling systems (60), and/or external resources (30) may be implemented using other types of computing devices without departing from the invention. For additional details regarding computing devices, refer to FIG. 10.

While the system of FIG. 1.1 has been illustrated and described as including a limited number of specific components, a system in accordance with embodiments of the invention may include additional, fewer, and/or different components without departing from the invention.

Turning to FIG. 1.2, FIG. 1.2 shows a diagram of an information handling system (100) in accordance with one or more embodiments of the invention. Any of the information handling systems (e.g., 60) of FIG. 1.1 may be similar to the information handling system (100) illustrated in FIG. 1.2.

As discussed above, the information handling system (100) may provide any quantity and type of computer implemented services. To provide the computer implemented services, resources of the information handling system may be used to instantiate one or more composed information handling systems. The composed information handling systems may provide the computer implemented services.

To provide computer implemented services, the information handling system (100) may include any number and type of hardware devices including, for example, one or more processors (106), any quantity and type of processor dedicated memory (104), one or more system control processors (114), and any number of hardware resources (118). These hardware devices may be logically divided into three resource sets including a compute resource set (102), a control resource set (108), and a hardware resource set (110).

The control resource set (108) of the information handling system (100) may facilitate formation of composed information handling systems. To do so, the control resource set (108) may prepare any quantity of resources from any number of hardware resource sets (e.g., 110) (e.g., of the information handling system (100) and/or other information handling systems) for presentation to processing resources of any number of computing resource sets (e.g., 102) (e.g., of the information handling system (100) and/or other information handling systems). Once prepared, the control resource set (108) may present the prepared resources as bare metal resources to the processors (e.g., 106) of the allocated computing resources. By doing so, a composed information handling system may be instantiated.

To prepare the resources of the hardware resource sets for presentation, the control resource set (108) may employ, for example, virtualization, indirection, abstraction, and/or emulation. These management functionalities may be transparent to applications hosted by the resulting instantiated composed information handling systems. Consequently, while unknown to the control plane entities of the composed information handling system, the composed information handling system may operate in accordance with any number of management models thereby providing for unified control and management of composed information handling systems. These functionalities may be transparent to applications hosted by composed information handling systems thereby relieving them from overhead associated with these functionalities.

For example, consider a scenario where a control resource set is instructed to instantiate a composed information handling system including a compute resource set and a hardware resource set that will contribute storage resources to the compute resource set. The control resource set may virtualize the storage resources of the hardware resource set to enable a select quantity of the storage resources to be allocated to the composed information handling system while reserving some of the storage resources for allocation to other composed information handling systems. However, the prepared storage resources may be presented to the compute resource set as bare metal resources. Consequently, the compute resource set may not need to host any control plane entities or otherwise incur overhead for utilizing the virtualized storage resources (e.g., the compute resource set may send bare metal communications to the control resource set, the control resource set may translate those bare metal communications into prepared resource compatible communications, and the control resource set may send the prepared resource compatible communications to the hardware resource set).

The control resource set (108) may also enable the utilization of any of the hardware components of the information handling system (100) by respective clients. When a composed information handling system is instantiated, it (and its hardware devices) may be utilized by a client by enabling the client to load application onto the composed information handling system. For example, the client may cause the composed information handling system to execute applications on the compute resource set (102) which, in turn, may utilize any number of hardware resource sets (e.g., 110) as part of their execution.

Because the control resource set (108) may mediate utilization of hardware resource sets (110) by compute resource sets (102), the control resource set (108) may transparently ascertain the use of the hardware devices of these resource sets, workloads being performed, and/or other information indicative of load states of the composed information handling systems (and/or quality of computer implemented services being provided by the composed information handling systems). To do so, the control resource set (108) may intercept (as part of presenting computing resources of hardware resource sets to compute resource sets) communications between resource sets, monitor workloads being performed by each of the respective resource sets, monitor power utilization by these resource sets, and/or may perform other actions to identify the use of these hardware devices by respective clients.

The collected use information may be used, for example, to ascertain whether additional resources should be added to composed information handling systems, to ascertain whether resources should be removed from composed information handling systems, to notify clients of their use of these resources (e.g., if the clients are being billed for use as part of a pay for use infrastructure deployment), to obtain information useable to estimate future computing resource requirements for hosting various applications and/or performing various types of workloads, and/or for other purposes.

The compute resource set (102) may include one or more processors (106) operably connected to the processor dedicated memory (104). Consequently, the compute resource set (102) may host any number of executing processes thereby enabling any number and type of workloads to be performed. When performing the workloads, the compute resource set (102) may utilize computing resources provided by the hardware resource set (110) of the information handling system (100), hardware resource sets of other information handling systems, and/or external resources.

The processors (106) of the compute resource set (102) may be operably connected to one or more system control processors (114) of the control resource set (108). For example, the processors (106) may be connected to a compute resource interface (112), which is also connected to the system control processors (114). The compute resource interface (112) may enable the processors (106) to communicate with other entities via bare metal communications. Also, the compute resource interface (112) may enable system control processors (114) of the control resource set (108) to monitor the activity of the processors (106) and/or processor dedicated memory (104) to identify use of these hardware devices by clients. For example, the compute resources interface (112) may support sideband communications to the hardware devices of the compute resource set (102) thereby enabling utilization information for these hardware devices to be obtained by the system control processors (114).

The system control processors (114) of the control resource set (108) may present computing resources to the processors (106) as bare metal resources. In other words, from the point of view of the processors (106), any number of bare metal resources may be operably connected to it via the compute resources interface (112) when, in reality, the system control processors (114) are operably connected to the processors (106) via the compute resources interface (112). In other words, the system control processors (114) may manage presentation of other types of resources (e.g., computing resources of the hardware resource set (110)), external resources, other hardware resource sets of other information handling systems, etc.) to the compute resource set (102).

By presenting the computing resources to the processors as bare metal resources, control plane entities (e.g., applications) such as hypervisors, emulators, and/or other types of management entities may not need to be hosted (e.g., executed) by the processors (106) for the processors (106) and entities hosted by them to utilize the computing resources allocated to a composed information handling system. Accordingly, all of the processing resources provided by the compute resource set (102) may be dedicated to providing the computer implemented services.

For example, the processors (106) may utilize mapped memory addresses to communicate with the bare metal resources presented by the system control processors (114) to the processors (106). The system control processors (114) may obtain these communications and appropriately remap (e.g., repackage, redirect, encapsulate, etc.) the communications to the actual hardware devices providing the computing resources, which the processors (106) are interacting with via the compute resources interface (112) and/or hardware resources interface (116), discussed below. Consequently, indirection, remapping, and/or other functions required for resource virtualization, emulation, abstraction, or other methods of resource allocation (other than bare metal) and management may not need to be implemented via the processors (106).

By doing so, any number of functions for a composed information handling system may be automatically performed in a manner that is transparent to the control plane. Accordingly, a composed information handling system may operate in a manner consistent with a unified, consistent architecture or model (e.g., communications model, data storage model, etc.) by configuring the operation of one or more system control processors in a manner consistent with the architecture or model.

In one or more embodiments of the invention, control plane entities utilize computing resources presented through one or more layers of indirection, abstraction, virtualization, etc. In other words, an indirect use of hardware devices and computing resources provided thereby. In the information handling system of FIG. 1.2, the system control processors (114) may present abstracted resources, indirection layers, virtualization layers, etc. as bare metal resources, In one or more embodiments of the invention, data plane entities directly utilize computing resources. For example, data plane entities may instruct hardware devices on their operation thereby directly utilizing computing resources provided thereby. Data plane entities may present the computing resources to control plane entities using one or more layers of indirection, abstraction, virtualization, etc.

The system control processors (114) may present any number of resources operably connected to it (e.g., the hardware resource set (110)), other resources operably connected to it via an interface (e.g., hardware resources interface (116), etc.) as bare metal resources to the processors (106) of the compute resource set (102). Consequently, the system control processors (114) may implement device discovery processes compatible with the processors (106) to enable the processors (106) to utilize the presented computing resources.

For example, the hardware resource set (110) may include hardware resources (118) operably connected to the system control processors (114) via a hardware resources interface (116). The hardware resources (118) may include any number and type of hardware devices that provide computing resources. For additional details regarding the hardware resources (118), refer to FIG. 2.

In another example, the system control processors (114) may be operably connected to other hardware resource sets of other information handling systems via hardware resources interface (116), network (130), and/or other system control processors of the other information handling systems. The system control processors may cooperatively enable hardware resource sets of other information handling systems to be prepared and presented as bare metal resources to the compute resource set (102).

In an additional example, the system control processors (114) may be operably connected to external resources via hardware resources interface (116) and network (130). The system control processors (114) may prepare and present the external resources as bare metal resources to the compute resource set (102).

The system control processors (114), by presenting resources to the compute resource set (102), may be able to monitor the utilization of the presented resources in a manner that is transparent to the applications or other entities executing using the processors (106). Consequently, these entities may not be able to interfere with monitoring of the use of these resources. In contrast, if an agent or other entity for monitoring computing resource use rates is executing using the processors (106), other entities executing using the processors (106) may be able to interfere with the operation of the monitoring entity. Accordingly, embodiments of the invention may provide a method of monitoring computing resources use that is less susceptible to interference by other entities. By doing so, resource allocation decisions made based on the collected information may better reflect the actual use of resources by the composed information handling systems.

Figure 3:
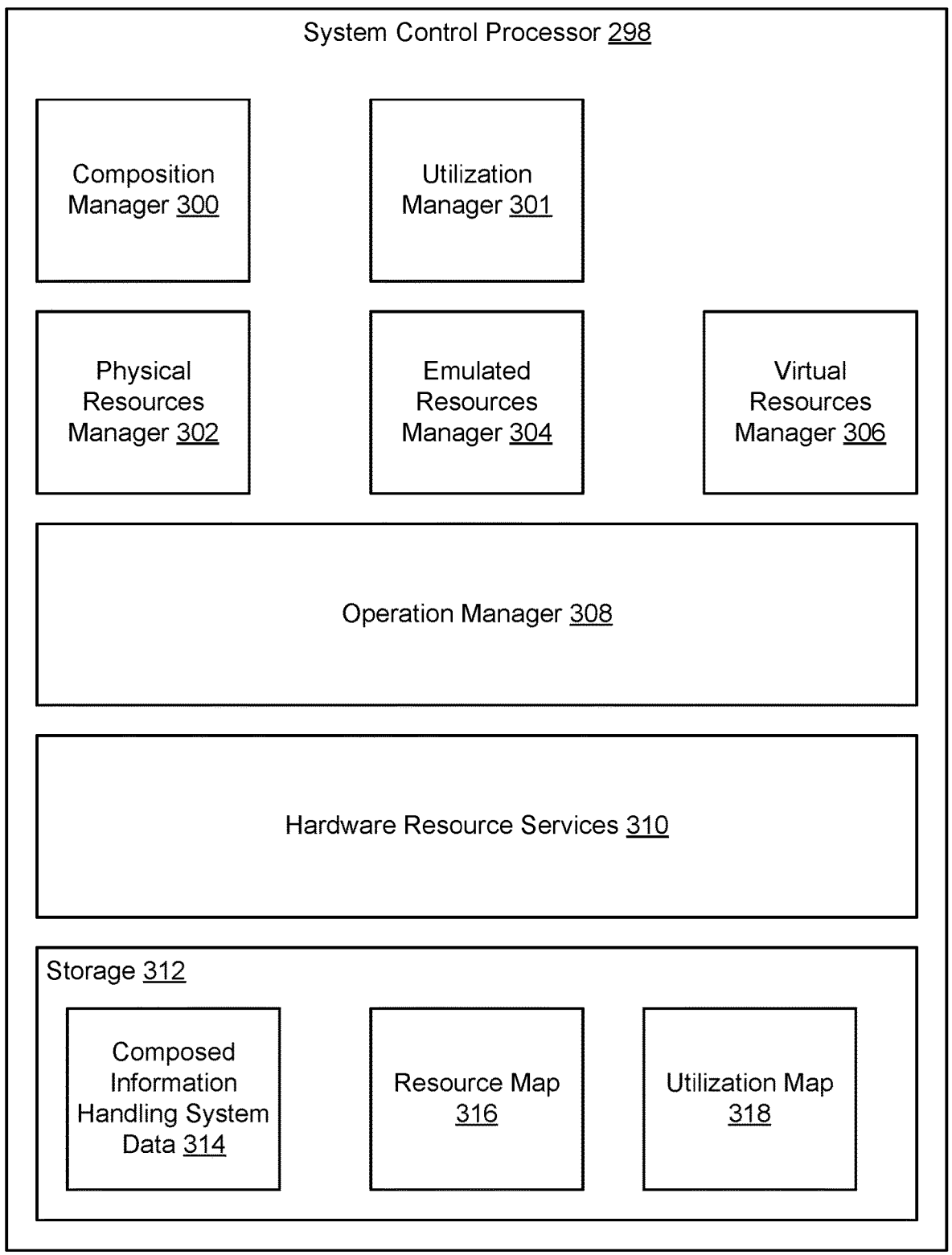
FIG. 3 shows a diagram of a system control processor in accordance with one or more embodiments of the invention.

For additional details regarding the operation and functions of the system control processors (114), refer to FIG. 3.

The compute resources interface (112) may be implemented using any suitable interconnection technology including, for example, system buses such as compute express links or other interconnection protocols. The compute resources interface (112) may support any input/output (IO) protocol, any memory protocol, any coherence interface, etc. The compute resources interface (112) may support processor to device connections, processor to memory connections, and/or other types of connections. The compute resources interface (112) may be implemented using one or more hardware devices including circuitry adapted to provide the functionality of the compute resources interface (112).

The compute resources interface (112) may also support sideband communications between the system control processors (114), the processors (106), and/or the processor dedicated memory (104). Consequently, the system control processors (114) may be able to monitor the operations of these other devices to identify the utilization of these hardware devices by clients, identify workloads being performed by these devices, etc.

The hardware resources interface (116) may be implemented using any suitable interconnection technology including, for example, system buses such as compute express links or other interconnection protocols. The hardware resources interface (116) may support any input/output (TO) protocol, any memory protocol, any coherence interface, etc. The hardware resources interface (116) may support processor to device connections, processor to memory connections, and/or other types of connections. The hardware resources interface (116) may be implemented using one or more hardware devices including circuitry adapted to provide the functionality of the hardware resources interface (116).

In some embodiments of the invention, the compute resource set (102), control resource set (108), and/or hardware resource set (110) may be implemented as separate physical devices. In such a scenario, the compute resources interface (112) and hardware resources interface (116) may include one or more networks enabling these resource sets to communicate with one another. Consequently, any of these resource sets (e.g., 102, 108, 110) may include network interface cards or other devices to enable the hardware devices of the respective resource sets to communicate with each other.

In one or more embodiments of the invention, the system control processors (114) support multiple, independent connections. For example, the system control processors (114) may support a first network communications connection (e.g., an in-band connection) that may be allocated for use by applications hosted by the processors (106). The system control processors (114) may also support a second network communications connection (e.g., an out-of-band connection) that may be allocated for use by applications hosted by the system control processors (114). The out-of-band connection may be utilized for management and control purposes while the in-band connection may be utilized to provide computer implemented services. These connections may be associated with different network endpoints thereby enabling communications to be selectively directed toward applications hosted by the processors (106) and/or system control processors (114). As will be discussed in greater detail with respect to FIG. 3, the system control processors (114) may utilize the out-of-band connections to communicate with other devices to manage (e.g., instantiate, monitor, modify, etc.) composed information handling systems.

The network (130) may correspond to any type of network and may be operably connected to the Internet or other networks thereby enabling the information handling system (100) to communicate with any number and type of other devices.

The information handling system (100) may be implemented using computing devices. The computing devices may be, for example, a server, laptop computer, desktop computer, node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the information handling system (100) described in this application and/or all, or a portion, of the methods illustrated in FIGS. 5.1-8. The information handling system (100) may be implemented using other types of computing devices without departing from the invention. For additional details regarding computing devices, refer to FIG. 7.

While the information handling system (100) has been illustrated and described as including a limited number of specific components, an information handling system in accordance with embodiments of the invention may include additional, fewer, and/or different components without departing from the invention.

Turning to FIG. 2, FIG. 2 shows a diagram of the hardware resources (118) in accordance with one or more embodiments of the invention. As noted above, system control processors of information handling system may present resources including, for example, some of the hardware resources (118) to form a composed information handling system.

The hardware resources (118) may include any number and types of hardware devices that may provide any quantity and type of computing resources. For example, the hardware resources (118) may include storage devices (200), memory devices (202), and special purpose devices (204).

The storage devices (200) may provide storage resources (e.g., persistent storage) in which applications hosted by a composed information handling system may store data including any type and quantity of information. The storage devices (200) may include any type and quantity of devices for storing data. The devices may include, for example, hard disk drives, solid state drives, tape drives, etc. The storage devices (200) may include other types of devices for providing storage resources without departing from the invention. For example, the storage devices (200) may include controllers (e.g., redundant array of disk controllers), load balancers, and/or other types of devices.

The memory devices (202) may provide memory resources (e.g., transitory and/or persistent storage) in which a composed information handling system may store data including any type and quantity of information. The memory devices (202) may include any type and quantity of devices for storing data. The devices may include, for example, transitory memory such as random access memory, persistent memory such as storage class memory, etc. The memory devices (202) may include other types of devices for providing memory resources without departing from the invention. For example, the storage devices (200) may include controllers (e.g., replication managers), load balancers, and/or other types of devices.

The special purpose devices (204) may provide other types of computing resources (e.g., graphics processing resources, computation acceleration resources, etc.) to composed information handling systems. The special purpose devices (204) may include any type and quantity of devices for providing other types of computing resources. The special purpose devices (204) may include, for example, graphics processing units for providing graphics processing resources, compute accelerators for accelerating corresponding workloads performed by composed information handling systems, application specific integrated circuits (ASICs) for performing other functionalities, digital signal processors for facilitating high speed communications, field programmable gate arrays to perform customized computing functionalities, etc. The special purpose devices (204) may include other types of devices for providing other types of computing resources without departing from the invention.

The system control processors of the information handling systems may mediate presentation of the computing resources provided by the hardware resources (118) to computing resource sets (e.g., as bare metal resources to processors). When doing so, the system control processors may provide a layer of abstraction that enables the hardware resources (118) to be, for example, virtualized, emulated as being compatible with other systems, and/or directly connected to the compute resource sets (e.g., pass through). Consequently, the computing resources of the hardware resources (118) may be finely, or at a macro level, allocated to different composed information handling systems.

Additionally, the system control processors may manage operation of these hardware devices in accordance with one or more models including, for example, data protection models, security models, workload performance availability models, reporting models, etc. For example, the system control processors may cause multiple copies of data to be redundantly stored, to be stored with error correction code, and/or other information usable for data integrity purposes.

The manner of operation of these devices may be transparent to the computing resource sets utilizing these hardware devices for providing computer implemented services. Consequently, even though the resulting composed information handling system control plane may be unaware of the implementation of these models, the composed information handling systems may still operate in accordance with these models thereby providing a unified method of managing the operation of composed information handling systems.

Further, the system control processors may monitor the use of these hardware devices by clients. As will be discussed below, the system control processors may host applications that monitor communications indicative of utilization of these hardware devices to determine whether additional resources should be allocated to them, whether resources should be deallocated from them, whether new instances of composed information handling systems should be instantiated, etc.

While the hardware resources (118) have been illustrated and described as including a limited number of specific components, local hardware resources in accordance with embodiments of the invention may include additional, fewer, and/or different components without departing from the invention.

As discussed above, information handling systems may include system control processors that may be used to instantiate composed information handling systems. FIG. 3 shows a diagram of a system control processor (298) in accordance with one or more embodiments of the invention. Any of the system control processors included in control resources sets of FIG. 1.2 may be similar to the system control processor (298) illustrated in FIG. 3.

The system control processor (298) may facilitate instantiation, reallocation of resources to/from composed systems, and operation of composed information handling systems. By doing so, a system that includes information handling systems may dynamically instantiate and recompose (e.g., add/remove resources, instantiate new composed systems and transfer application to new composed systems, etc.) composed information handling systems to provide computer implemented services.

To instantiate and operate composed information handling systems, the system control processor (298) may include a composition manager (300), a utilization manager (301), a physical resources manager (302), an emulated resources manager (304), a virtual resources manager (306), an operation manager (308), hardware resource services (310), and storage (312). Each of these components of the system control processor is discussed below.

The composition manager (300) may manage the process of instantiating and operating composed information handling systems. To provide these management services, the composition manager (300) may include functionality to (i) obtain information regarding the hardware components of the information handling system (e.g., obtain telemetry data regarding the information handling system), (ii) provide the obtained information to other entities (e.g., management entities such as system control processor manager (50, FIG. 1.1)), (iii) obtain composition requests for composed information handling systems, (iv) based on the composition requests, prepare and present resources as bare metal resources to compute resource sets, (v) instantiate applications in composed information handling systems to cause the composed information handling systems to provide computer implemented services, conform their operation to security models, etc., (viii) add/remove/modify resources presented to the compute resource sets of composed information handling systems dynamically in accordance with workloads being performed by the composed information handling systems, and/or (viii) coordinate with other system control processors to provide distributed system functionalities and/or transfer performance of applications and/or computer implemented services between composed information handling systems. By providing the above functionalities, a system control processor in accordance with one or more embodiments of the invention may enable distributed resources from any number of information handling systems to be aggregated into a composed information handling system to provide computer implemented services meeting the expectations of clients.

To obtain information regarding the hardware components of the information handling system, the composition manager (300) may inventory the components of the information handling system hosting the system control processor. The inventory may include, for example, the type and model of each hardware component, versions of firmware or other code executing on the hardware components, and/or information regarding hardware components of the information handling system that may be allocated to form composed information handling systems.

The composition manager (300) may obtain composition requests from other entities (e.g., management entities tasked with instantiating composed information handling systems), as pre-loaded instructions present in storage of the system control processor, and/or via other methods. The composition requests may specify, for example, the types and quantities of computing resources to be allocated to a composed information handling system.

In one or more embodiments of the invention, the composition requests specify the computing resource allocations using an intent based model. For example, rather than specifying specific hardware devices (or portions thereof) to be allocated to a particular compute resource set to obtain a composed information handling system, the resource requests may only specify that a composed information handling system is to be instantiated having predetermined characteristics, that a composed information handling system will perform certain workloads or execute certain applications, and/or that the composed information handling system be able to perform one or more predetermined functionalities. In such a scenario, the composition manager may decide how to instantiate the composed information handling system (e.g., which resources to allocate, how to allocate the resources (e.g., virtualization, emulation, redundant workload performance, data integrity models to employ, etc.), to which compute resource set(s) to present corresponding computing resources, etc.).

In one or more embodiments of the invention, the composition requests specify the computing resource allocations using an explicit model. For example, the composition requests may specify (i) the resources to be allocated, (ii) the manner of presentation of those resources (e.g., emulating a particular type of device using a virtualized resource vs. path through directly to a hardware component), and (iii) the compute resource set(s) to which each of the allocated resources are to be presented.

In addition to specifying resource allocations, the composition requests may also specify, for example, applications to be hosted by the composed information handling systems, security models to be employed by the composed information handling systems, communication models to be employed by the composed information handling systems, services to be provided to the composed information handling systems, user/entity access credentials for use of the composed information handling systems, and/or other information usable to place the composed information handling systems into states in which the composed information handling systems provide desired computer implemented services.

To prepare and present resources to compute resource sets based on the composition requests, the system control processors may implement, for example, abstraction, indirection, virtualization, mapping, emulation, and/or other types of services that may be used to present any type of resources as a resource that is capable of bare metal utilization by compute resource sets. To provide these services, the composition manager (300) may invoke the functionality of the physical resources manager (302), the emulated resources manager (304), and/or the virtual resources manager (306).

When presenting the resources to the compute resource sets, the system control processor (298) may present the resources using an emulated data plane. For example, the system control processors (298) may receive bare metal communications (e.g., IO from the processors that presumes a direct connection to another hardware device) and respond in a manner consistent with responses of corresponding bare metal devices (e.g., memory). When doing so, the system control processor (298) may translate the communications into actions. The actions may be provided to the hardware devices used by the system control processor (298) to present the bare metal resources to the compute resource set(s). In turn, the hardware devices may perform the actions which results in a composed information handling system providing desired computer implemented services.

In some scenarios, multiple system control processors may cooperate to present bare metal resources to a compute resource set. For example, a single information handling system may not include sufficient hardware devices to present a quantity and/or type of resources to a compute resource set as specified by a composition request (e.g., present two storage devices to a compute resource set when a single information handling system only includes a single storage device). In this scenario, a second system control processor of a second information handling system operably connected to the system control processor tasked with presenting the resources to a compute resource set may prepare one of its storage devices for presentation. Once prepared, the second system control processor may communicate with the system control processor to enable the system control processor to present the prepared storage device (i.e., the storage device in the information handling system) to the compute resource set. By doing so, resources from multiple information handling systems may be aggregated to present a desired quantity of resources to compute resource set(s) to form a composed information handling system.

By forming composed information handling systems as discussed above, embodiments of the invention may provide a system that is able to effectively utilize distributed resources across a range of devices to provide computer implemented services.

When providing its functionality, the composition manager (300) may perform all, or a portion, of the methods illustrated in FIGS. 5.1-8.

After a composed information handling system is formed, a client may begin to utilize the hardware devices of the composed information handling system by causing desired computer implemented services to be provided using the hardware devices. The utilization manager (301) may monitor the use of these hardware devices by the client to ascertain whether the services provided using these hardware devices meet the expectations of the client.

To do so, the utilization manager (301) may (i) monitor the components of the compute resource sets including the actions being performed, power being consumed, communications sent, etc., (ii) monitor communications from the compute resource sets destined for other hardware devices (e.g., of hardware resource sets, other compute resource sets of other information handling systems, external resources, etc.) by intercepting them as they traverse the system control processor (298), (iii) based on the intercepted communications, estimate use rates of these hardware devices by the client, (iv) store the use rate information, (v) provide the use rate information, and/or (vi) perform action sets based on the use rate information and/or actions specified by management entities. The action sets may include, for example, modifying the computing resources allocated to a composed information handling system, instantiating new composed information handling systems, transferring workloads/applications/computer implemented services to other composed information handling systems (and/or from other composed information handling systems to the composed information handling system including the system control processor), and/or perform other actions that cause the computer implemented services provided by the composed information handling systems better meet client expectations.

When providing its functionality, the utilization manager (301) may perform all, or a portion, of the methods illustrated in FIGS. 5.1-8.

The physical resources manager (302) may manage presentation of resources to compute resource sets. For example, the physical resources manager (302) may generate, for example, translation tables that specify actions to be performed in response to bare metal communications obtained from compute resource sets. The translation tables may be used to take action in response to communications from compute resource sets.

The physical resources manager (302) may generate the translation tables based on the components of the compute resource sets, allocations or other types of commands/communications obtained from the compute resource sets, and the resources of the information handling system(s) allocated to service the compute resource set. For example, when a compute resource set is presented with a bare metal resource, it may go through a discovery process to prepare the bare metal resource for use. As the discovery process proceeds, the compute resource set may send commands/communications to the bare metal resource to, for example, discover its address range. The physical resources manager (302) may monitor this process, respond appropriately, and generate the translation table based on these commands and the resources available to service these bare metal commands/communications (e.g., to obtain address translation tables, emulation tables, etc.).

For example, consider a scenario where a virtualized disk is allocated to service bare metal storage commands from a compute resource set. In such a scenario, the physical resources manager (302) may generate a translation table that translates physical write from the compute resource set to virtualized writes corresponding to the virtualized disk. Consequently, the virtualized disk may be used by the system control processor (298) to present bare metal resources to the compute resource set.

The emulated resources manager (304) may generate emulation tables that enable resources that would otherwise be incompatible with a compute resource set to be compatible with the compute resource set. Different types of hardware devices of a compute resource set may be compatible with different types of hardware devices. Consequently, resources allocated to provide bare metal resources may not necessarily be compatible with the hardware devices of a compute resource set. The emulated resources manager (304) may generate emulation tables that map bare metal communications obtained from a compute resource set to actions that are compatible with resources allocated to provide bare metal resources to the compute resource sets.

The virtual resources manager (306) may manage virtualized resources that may be allocated to provide bare metal resources to compute resource sets. For example, the virtual resources manager (306) may include hypervisor functionality to virtualized hardware resources and allocate portions of the virtualized resources for use in providing bare metal resources.

While the physical resources manager (302), emulated resources manager (304), and virtual resources manager (306) have been described as generating tables, these components of the system control processor may generate other types of data structures or utilize different management models to provide their respective functionalities without departing from the invention.

The functionalities of the physical resources manager (302), emulated resources manager (304), and virtual resources manager (306) may be utilized in isolation and/or combination to provide bare metal resources to compute resource sets. By doing so, the system control processor (298) may address compatibility issues, sizing issues to match available resources to those that are to be allocated, and/or other issues to enable bare metal resources to be presented to compute resource sets.

When providing bare metal resources, the composition manager (300) may invoke the functionality of the physical resources manager (302), emulated resources manager (304), and virtual resources manager (306). Consequently, resources may be presented as bare metal resources via pass-through (i.e., forwarding IO from compute resource sets to hardware devices), bare metal resource addressing of virtualized resources, and/or as emulated resources compatible with the hardware components of the compute resource set.

The functionality of the physical resources manager (302), emulated resources manager (304), and virtual resources manager (306) may be invoked using any communication model including, for example, message passing, state sharing, memory sharing, etc.

The operation manager (308) may manage the general operation of the system control processor (298). For example, the operation manager (308) may operate as an operating system or other entity that manages the resources of the system control processor (298). The composition manager (300), utilization manager (301), physical resources manager (302), emulated resources manager (304), virtual resources manager (306), and/or other entities hosted by the system control processor (298) may call or otherwise utilize the operation manager (308) to obtain appropriate resources (e.g., processing resources, memory resources, storage, communications, etc.) to provide their functionalities.

The hardware resource services (310) may facilitate use of the hardware components of any number of hardware resource sets (e.g., 110, FIG. 1.1). For example, the hardware resource services (310) may include driver functionality to appropriately communicate with the hardware devices of hardware resource sets. The hardware resource services (310) may be invoked by, for example, the operation manager (308).

When providing their functionalities, any of the aforementioned components of the system control processor (298) may perform all, or a portion, of the methods illustrated in FIGS. 5.1-8.

The system control processor (298) may be implemented using computing devices. The computing devices may be, for example, an embedded computing device such as a system on a chip, a processing device operably coupled to memory and storage, or another type of computing device. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor (298) described in this application and/or all, or a portion, of the methods illustrated in FIGS. 5.1-8. The system control processor (298) may be implemented using other types of computing devices without departing from the invention. For additional details regarding computing devices, refer to FIG. 11.

In one or more embodiments of the invention, the system control processor (298) is implemented as an on-board device. For example, the system control processor (298) may be implemented using a chip including circuitry disposed on a circuit card. The circuit card may also host the compute resource sets and/or hardware resource sets managed by the system control processor (298).

In one or more embodiments of the invention, any of the composition manager (300), utilization manager (301), physical resources manager (302), emulated resources manager (304), virtual resources manager (306), operation manager (308), and/or hardware resource services (310) are implemented using a hardware device including circuitry. The hardware device may be, for example, a digital signal processor, a field programmable gate array, or an application specific integrated circuit. The circuitry may be adapted to cause the hardware device to perform the functionality of the composition manager (300), utilization manager (301), physical resources manager (302), emulated resources manager (304), virtual resources manager (306), operation manager (308), and/or hardware resource services (310). The composition manager (300), utilization manager (301), physical resources manager (302), emulated resources manager (304), virtual resources manager (306), operation manager (308), and/or hardware resource services (310) may be implemented using other types of hardware devices without departing from the invention.

In one or more embodiments of the invention, any of the composition manager (300), utilization manager (301), physical resources manager (302), emulated resources manager (304), virtual resources manager (306), operation manager (308), and/or hardware resource services (310) are implemented using a processor adapted to execute computing code stored on a persistent storage (e.g., as part of the system control processor (298) or operably connected to the system control processor (298) thereby enabling processors of the system control processor (298) to obtain and execute the computing code) that when executed by the processor performs the functionality of the composition manager (300), utilization manager (301), physical resources manager (302), emulated resources manager (304), virtual resources manager (306), operation manager (308), and/or hardware resource services (310). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In one or more embodiments disclosed herein, the storage (312) is implemented using physical devices that provide data storage services (e.g., storing data and providing copies of previously stored data). The devices that provide data storage services may include hardware devices and/or logical devices. For example, storage (312) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (312) may include a memory device (e.g., a dual in line memory device) in which data is stored and from which copies of previously stored data are provided. In another example, storage (312) may include a persistent storage device (e.g., a solid-state disk drive) in which data is stored and from which copies of previously stored data is provided. In a still further example, storage (312) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (312) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (312) may store data structures including, for example, composed information handling system data (314), a resource map (316), and a utilization map (318). Each of these data structures is discussed below.

The composed information handling system data (314) may be implemented using one or more data structures that includes information regarding composed information handling systems. For example, the composed information handling system data (314) may specify identifiers of composed information handling systems and resources that have been allocated to the composed information handling systems.

The composed information handling system data (314) may also include information regarding the operation of the composed information handling systems. The information may include, for example, workload performance data, resource utilization rates over time, and/or other information that may be utilized to manage the operation of the composed information handling systems.

The composed information handling system data (314) may further include information regarding management models employed by system control processors. For example, the composed information handling system data (314) may include information regarding duplicative data stored for data integrity purposes, redundantly performed workloads to meet high availability service requirements, encryption schemes utilized to prevent unauthorized access of data, etc.

The composed information handling system data (314) may be maintained by, for example, the composition manager (300). For example, the composition manager may add, remove, and/or modify information included in the composed information handling system data (314) to cause the information included in the composed information handling system data (314) to reflect the state of the composed information handling systems.

The data structures of the composed information handling system data (314) may be implemented using, for example, lists, tables, unstructured data, databases, etc. While illustrated in FIG. 3 as being stored locally, the composed information handling system data (314) may be stored remotely and may be distributed across any number of devices without departing from the invention.

The resource map (316) may be implemented using one or more data structures that include information regarding resources of the information handling system and/or other information handling systems. For example, the resource map (316) may specify the type and/or quantity of resources (e.g., hardware devices, virtualized devices, etc.) available for allocation and/or that are already allocated to composed information handling systems. The resource map (316) may be used to provide data to management entities such as system control processor managers.

The data structures of the resource map (316) may be implemented using, for example, lists, tables, unstructured data, databases, etc. While illustrated in FIG. 3 as being stored locally, the resource map (316) may be stored remotely and may be distributed across any number of devices without departing from the invention.

The resource map (316) may be maintained by, for example, the composition manager (300). For example, the composition manager (300) may add, remove, and/or modify information included in the resource map (316) to cause the information included in the resource map (316) to reflect the state of the information handling system and/or other information handling systems.

The utilization map (318) may be implemented using one or more data structures that includes information regarding the utilization of hardware devices of the composed information handling systems, workloads being performed by the hardware devices, and/or other types of information that may be used to ascertain the quality of computer implemented services being provided by a composed information handling system. For example, the utilization map (318) may specify identifiers of hardware devices of a composed information handling system, the workloads being performed by these hardware devices, the utilization rates of these hardware devices, etc.

The utilization map (318) may specify the resource utilization via any method. For example, the utilization map (318) map may specify a quantity of utilization, resource utilization rates over time, power consumption of hardware devices while utilized to provide the computer implemented services, workload (and/or statuses) performed using hardware devices, etc. The utilization map (318) may include other types of information used to quantify the quality of computer implemented services provided without departing from the invention.

The utilization map (318) may be maintained by, for example, the utilization manager (301). For example, the utilization manager (301) may add, remove, and/or modify information included in the utilization map (318) to cause the information included in the utilization map (318) to reflect the current utilization of the composed information handling systems.

The data structures of the utilization map (318) may be implemented using, for example, lists, tables, unstructured data, databases, etc. While illustrated in FIG. 3 as being stored locally, the utilization map (318) may be stored remotely and may be distributed across any number of devices without departing from the invention.

While the storage (312) has been illustrated and described as including a limited number and type of data, a storage in accordance with embodiments of the invention may store additional, less, and/or different data without departing from the invention.

While the system control processor (298) has been illustrated and described as including a limited number of specific components, a system control processor in accordance with embodiments of the invention may include additional, fewer, and/or different components without departing from the invention.

Figure 4:
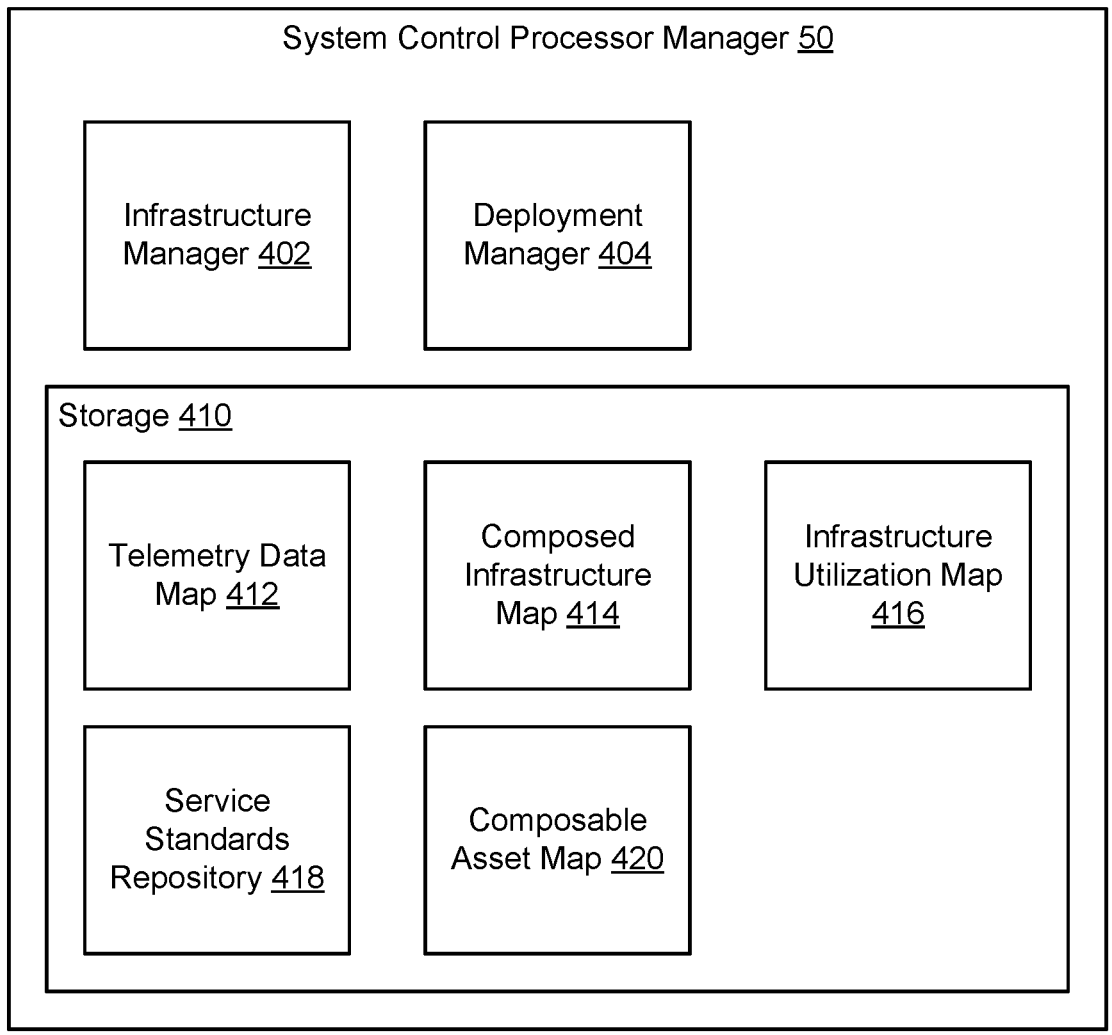
FIG. 4 shows a diagram of a system control processor manager in accordance with one or more embodiments of the invention.

As discussed above, a system control processor manager may cooperate with system control processors of control resource sets to instantiate composed information handling systems by presenting computing resources from hardware resource sets to processors of compute resource sets. FIG. 4 shows a diagram of the system control processor manager (50) in accordance with one or more embodiments of the invention.

The system control processor manager (50) may manage the process of instantiating composed information handling systems and recomposing composed information handling systems over time. To do so, the system control processor manager (50) may include an infrastructure manager (402), deployment manager (404), and storage (410). Each of these components is discussed below.

The infrastructure manager (402) may provide composition services. Composition services may include obtaining composition/recomposition requests for composed information handling systems, determining the resources to allocate to instantiate composed information handling systems, add/remove resources to recompose composed information handling systems, manage transfers of workloads between composed information handling systems for recomposition purposes, and cooperating with system control processors to allocate the identified resources. By doing so, the infrastructure manager (402) may cause any number of computer implemented services to be provided using the composed information handling systems.

To determine the resources to allocate to new composed information handling systems, the infrastructure manager (402) may employ an intent based model that translates an intent expressed in a composition request to one more allocations of computing resources. For example, the infrastructure manager (402) may match an expressed intent to resources to be allocated to satisfy that intent. A lookup table may specify the type, quantity, method of management, and/or other information regarding any number of computing resources that when aggregated will be able to satisfy a corresponding intent. The infrastructure manager (402) may identify resources for allocation to satisfy composition requests via other methods without departing from the invention.

To recompose composed information handling systems, the infrastructure manager (402) may add or remove resources from existing composed information handling systems or instantiate new composed information handling systems and transfer workloads from existing composed information handling systems to the new composed information handling systems. Consequently, the composed information handling systems performing the workloads may have different amounts and/or types of computing resources after being recomposed.

In some embodiments of the invention, the infrastructure manager (402) may recompose deployments. A deployment may be a group of composed information handling systems performing a predetermined function. In such a scenario, the infrastructure manager (402) may recompose one or more of the composed information handling systems of the deployment to recompose the deployment.

The infrastructure manager (402) may recompose infrastructure (e.g., deployments, individual composed information handling systems, etc.) in response to recomposition requests. The recomposition requests may be obtained from, for example, the deployment manager (404). As will be discussed in greater detail below, the deployment manager (404) may determine when and how infrastructure should be recomposed.

To cooperate with the system control processors for composed information handling system composition and recomposition purposes, the infrastructure manager (402) may obtain telemetry data regarding the computing resources of any number of information handling systems and/or external resources that are available for allocation. The infrastructure manager (402) may aggregate this data in a telemetry data map (412) which may be subsequently used to identify resources of any number of information handling systems and/or external resources to satisfy composition and/or recomposition requests (e.g., instantiate one or more composed information handling systems to meet the requirements of the composition requests, modify resource allocations to existing composed information handling systems, etc.).

When the infrastructure manager (402) identifies the computing resources to be allocated, the infrastructure manager (402) may communicate with any number of system control processors (e.g., of control resource sets of information handling systems) to implement the identified allocations. For example, the infrastructure manager (402) may notify a system control processor of a control resource set that portions of a hardware resource set are to be allocated to a compute resource set to instantiate a composed information handling system. The system control processor may then take action (e.g., prepare the portion of the hardware resource set for presentation to a processor of the compute resource set) in response to the notification.

As composed information handling systems are instantiated and/or recomposed, the infrastructure manager (402) may add information reflecting the resources allocated to composed information handling systems, the workloads being performed by the composed information handling systems, and/or other types of information to an infrastructure utilization map (416). The infrastructure manager (402) may utilize this information to, for example, decide whether computing resources should be added to or removed from composed information handling systems. Consequently, computing resources may be dynamically re-provisioned to meet changing workloads imposed on composed information handling systems.

In one or more embodiments of the invention, the infrastructure manager (402) is implemented using a hardware device including circuitry. The hardware device may be, for example, a digital signal processor, a field programmable gate array, or an application specific integrated circuit. The circuitry may be adapted to cause the hardware device to perform the functionality of the infrastructure manager (402). The infrastructure manager (402) may be implemented using other types of hardware devices without departing from the invention.

In one or more embodiments of the invention, the infrastructure manager (402) is implemented using a processor adapted to execute computing code stored on a persistent storage that when executed by the processor performs the functionality of the infrastructure manager (402). The processor may be a hardware processor including circuitry such as, for example, a central processing unit or a microcontroller. The processor may be other types of hardware devices for processing digital information without departing from the invention.

When providing its functionality, the infrastructure manager (402) may perform all, or a portion, of the methods illustrated in FIGS. 5.1-8.

The deployment manager (404) may provide recomposition services. Recomposition services may include (i) monitoring the utilization of computing resources of composed information handling systems, (ii) monitoring of the quality of computer implemented services by the composed information handling systems, (iii) monitoring the quantity of computing resources available for recomposing infrastructure, (iv) maintaining a listing of duplicative copies of infrastructure that may be instantiated using the quantity of computing resources available for recomposing infrastructure, (v) comparing the utilization of computing resources and/or quality of provided computer implemented services to standards (e.g., expectations) provided by clients or other entities, (vi) based on the determination, initiating recomposition of infrastructure using the listing of duplicative copies of infrastructure to cause the provided computer implemented services to meet the standards, (vii) based on the determination, initiating decomposition of composed information handling systems, and (viii) notify entities that additional resources should be made for recomposition purposes to enable the quality of computer implemented services provided using composed information handling systems to be improved. By doing so, the deployment manager (404) may improve the likelihood that computer implemented services provided by composed information handling systems meet client expectations.

For example, consider a scenario where a number of composed information handling systems have been instantiated and that a client has loaded a number of virtual machines onto the composed information handling systems. These virtual machines may provide valuable computer implemented services. However, overtime the resources available to the composed information handling systems may no longer be able to keep up with the computing resources demands of the virtual machines. In such a scenario, the deployment manager (404) may identify that that quality of the computer implemented services being provided falls below that expected by a client. In response to the determination, the deployment manager (404) may first ascertain whether other composed information handling systems performing services for the client may be able to take on the computing resource load of one or more of the virtual machines thereby reducing the computing resource demand on the composed information handling systems hosting the virtual machines. If no other composed information handling systems are available to take on a portion of the computing resources load, then the deployment manager (404) may generate a recomposition request which requests that a new composed information handling system be instantiated. The composition request may then be provided to the infrastructure manager (402) which, in turn, may instantiate the new composed information handling system. After instantiation, the deployment manager (404) may transfer one of the virtual machines (after appropriate provisioning of the new composed information handling system including, for example, a hypervisor) to the new composed information handling system. Consequently, the quality of computer implemented services may be improved thereby meeting the expectations of the client by distributing the computing resources load across additional hardware resources.

In another example, consider a scenario in which a client provides a service level agreement that specifies a predetermined response time for a particular computer implemented service being provided by a composed information handling system. If the deployment manager (404) identifies that the composed information handling system is failing to provide the computer implemented service within the allotted time, the deployment manager (404) may identify that the composed information handling system is under-provisioned. Consequently, the deployment manager (404) may send a request to the infrastructure manager (402) requesting that the composed information handling system be recomposed to include additional computing resources.

In a further example, consider a scenario in which a client provides a service level agreement that specifies a predetermined response time for a particular computer implemented service being provided by a composed information handling system. If the deployment manager (404) identifies that the composed information handling system is providing the computer implemented service well in advance of the allotted time, the deployment manager (404) may identify that the composed information handling system is over-provisioned. Consequently, the deployment manager (404) may send a request to the infrastructure manager (402) requesting that the composed information handling system be recomposed to include fewer computing resources.

In an additional example, consider a scenario in which a client provides a service level agreement that specifies a predetermined response time for a particular computer implemented service being provided by a composed information handling system. If the deployment manager (404) identifies that the composed information handling system is failing to provide the computer implemented service within the allotted time, the deployment manager (404) may identify that the composed information handling system is under-provisioned. In response to the determination, the deployment manager (404) may calculate a potential improvement in the responsiveness of the composed information handling system if a new composed information handling system having addition computing resources was instantiated and the workloads being performed by the composed information handling system were transferred to the new composed information handling system. If the improvement in responsiveness allow the predetermined response time for providing the computer implemented service, then the deployment manager (404) may send a request to the infrastructure manager (402) requesting that a new composed information handling system be instantiated with corresponding computing resources and that the workload being performed by the composed information handling system be transferred to the new composed information handling system.

When providing the recomposition services, the deployment manager (404) may maintain a service standards repository (418) that includes information reflect the expectations of services provided by composed information handling systems. For example, the deployment manager (404) may include service level agreements and/or other quantifications of the expected quality of computer implemented services to be provided by composed information handling system.

To facilitate rapid recomposition and analysis of potential recomposition, the deployment manager (404) may maintain a composable asset map (420). The composable asset map (420) may be a shadow mapping of existing composed information handling systems. The shadow mapping may indicate which of the composed information handling systems may be duplicated (e.g., via instantiation of new composed information handling systems and/or recomposition of existing composed information handling systems) using free computing resources (e.g., those not yet allocated to composed information handling systems).

The composable asset map (420) may also specify the computing resource cost for instantiating new composed information handling systems, recomposing composed information handling systems, and/or transferring workloads between composed information handling systems. Because the computing resource cost for performing these activities may not be negligible, it may not be advantageous to attempt to recompose composed information handling systems under all circumstances. Accordingly, the information included in the composable asset map (420) may be used to determine whether to recompose composed information handling systems (and/or deployments, other infrastructure types, etc.) based, in part, on the cost of recomposing the infrastructure.

For example, consider a scenario where a client provides an expected response time for a particular computer implemented service. If a composed information handling system that provides the computer implemented service fails to meet the response time for providing the service, then the deployment manager (404) may determine that, even if the composed information handling system was recomposed, it will still not meet the response time due to the computing resource cost of composition. Consequently, the deployment manager (404) may elect to not recompose the composed information handling system even though it is failing to meet the client's expectations.

In one or more embodiments of the invention, the deployment manager (404) is implemented using a hardware device including circuitry. The hardware device may be, for example, a digital signal processor, a field programmable gate array, or an application specific integrated circuit. The circuitry may be adapted to cause the hardware device to perform the functionality of the deployment manager (404). The deployment manager (404) may be implemented using other types of hardware devices without departing from the invention.

In one or more embodiments of the invention, the deployment manager (404) is implemented using a processor adapted to execute computing code stored on a persistent storage that when executed by the processor performs the functionality of the deployment manager (404). The processor may be a hardware processor including circuitry such as, for example, a central processing unit or a microcontroller. The processor may be other types of hardware devices for processing digital information without departing from the invention.

When providing its functionality, the deployment manager (404) may perform all, or a portion, of the methods illustrated in FIGS. 5.1-8. While illustrated and described as separate entities, the functionalities of the infrastructure manager (402) and the deployment manager (404) may be performed by a single entity (e.g., either of these entities and/or other entities) without departing from the invention.

In one or more embodiments disclosed herein, the storage (410) is implemented using physical devices that provide data storage services (e.g., storing data and providing copies of previously stored data). The devices that provide data storage services may include hardware devices and/or logical devices. For example, storage (410) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (410) may include a memory device (e.g., a dual in line memory device) in which data is stored and from which copies of previously stored data are provided. In another example, storage (410) may include a persistent storage device (e.g., a solid-state disk drive) in which data is stored and from which copies of previously stored data is provided. In a still further example, storage (410) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (410) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or another hardware device that allocates the storage resources of the physical storage devices.

The storage (410) may store data structures including, for example, the telemetry data map (412), the composed infrastructure map (414), the infrastructure utilization map (416), the service standards repository (418), and the composable asset map (420). These data structures may be maintained by, for example, the infrastructure manager (402) and/or the deployment manager (404). For example, the infrastructure manager (402) and/or deployment manager (404) may add, remove, and/or modify information included in these data structures to cause the information included in these data structures to reflect the state of any number of information handling systems, external resources, and/or composed information handling systems.

Any of these data structures may be implemented using any combination and quantity of, for example, lists, tables, unstructured data, databases, etc. While illustrated in FIG. 4 as being stored locally, any of these data structures may be stored remotely and may be distributed across any number of devices without departing from the invention.

While the storage (410) has been illustrated and described as including a limited number and type of data, a storage in accordance with embodiments of the invention may store additional, less, and/or different data without departing from the invention.

While the system control processor manager (50) has been illustrated and described as including a limited number of specific components, a system control processor manager in accordance with embodiments of the invention may include additional, fewer, and/or different components than those illustrated in FIG. 4 without departing from the invention.

As discussed above, the system of FIG. 1.1 may provide computer implemented services using composed information handling systems. FIGS. 5.1-5.2 show methods that may be performed by components of the system of FIG. 1.1 to manage composed information handling systems.

FIG. 5.1 shows a flowchart of a method in accordance with one or more embodiments of the invention. The method depicted in FIG. 5.1 may be performed to provide computer implemented services using a composed information handling system in accordance with one or more embodiments of the invention. The method shown in FIG. 5.1 may be performed by, for example, a system control processor manager (e.g., 50, FIG. 1.1). Other components of the system in FIG. 1.1 may perform all, or a portion, of the method of FIG. 5.1 without departing from the invention.

While FIG. 5.1 is illustrated as a series of steps, any of the steps may be omitted, performed in a different order, additional steps may be included, and/or any or all of the steps may be performed in a parallel and/or partially overlapping manner without departing from the invention.

In step 500, a composition request for a composed information handling system is obtained. The composition request may be obtained using any method without departing from the invention. For example, the composition request may be obtained as part of a message from another entity operably connected to a system control processor manager. In another example, the composition request may be locally stored in a storage of a system control processor manager.

In one or more embodiments of the invention, the composition request may be obtained from a deployment manager. The deployment manager may provide the composition request as part of a process of improving computer implemented services.

The composition request may be a data structure specifying that the composed information handling system is to be instantiated. As discussed with respect to FIG. 3, the composition request may be specific (i.e., includes a listing of resources to be allocated to the composed information handling system) or intent based (i.e., a desired outcome without specifying the resources to be allocated). The composition request may include any type and quantity of information usable to determine how to instantiate a composed information handling system.

In one or more embodiments of the invention, the composition request includes a list of computing resources to be allocated to the composed information handling system. For example, the composition request may specify computing resources, memory resources, storage resources, graphics processing resources, compute acceleration resources, communications resources, etc. The list may include any type and quantity of computing resources.

In one or more embodiments of the invention, the composition request specifies how the computing resources are to be presented. For example, the composition request may specify virtualization, emulation, etc. for presenting the computing resources.

In one or more embodiments of the invention, the composition request specifies how the resources used to present the computing resources are to be managed (e.g., a management model such as data integrity, security, management, usability, performance, etc.). For example, the composition request may specify levels of redundancy for data storage, data integrity to be employed (e.g., redundant array of independent disks (RAID), error correction code (ECC), etc.), levels of security to be employed for resources (e.g., encryption), and/or other information that specifies how system control processors are to utilize resources for presentation of resources to composed information handling systems. The methods employed by the system control processors may be transparent to the composed information handling systems because the resources may be presented to the compute resource sets of the composed information handling systems as bare metal resources while the system control processors provide the management functionality.

In one or more embodiments of the invention, the composition request includes a list of applications to be hosted by the composed information handling system. The list may include any type and quantity of applications.

The composition request may also specify the identities of one or more system control processors hosted by other devices. In some scenarios, as noted above, resources from other information handling systems may be used to form a composed information handling system. The identifiers of the system control processors of these other information handling systems may be used to form operable connections between the system control processors. These connections may be used by the system control processors to present, as bare metal resources, computing resources from other information handling systems to compute resource set(s) of the composed information handling system.

For example, a system control processor of a first information handling system may manage a storage device as a virtualized resource. The system control processor may connect to a second system control processor which, in turn, is operably connected to a compute resource set. The second control processor may operate as a pass through for the system control processor while presenting the virtualized resource as a bare metal resource to the compute resource set. Consequently, when the compute resource set attempts to communicate with the storage, the compute resource set may send a bare metal communication to the system control processor, the system control processor may relay the bare metal communication to the second system control processor, and the second system control processor may processes the bare metal communication in accordance with its virtualization model (e.g., converting a logical block address to a physical block address in accordance with the virtualization model) to instruct the storage device to perform one or more actions to satisfy the bare metal communication.

In one or more embodiments of the invention, the composition request specifies a desired outcome. The desired outcome may be, for example, computer implemented services to be provided in response to the composition request. In another example, the desired outcome may be a list of applications to be hosted in response to the composition request. In other words, the composition request may specify a desired outcome without specifying the resources that are to be used to satisfy the requests, the methods of managing the resources, models employed to provide for data integrity/security/etc. Such a composition request may be referred to as an intent based composition request.

In step 502, at least one compute resource set having computing resources specified by the composition request is identified. The at least one compute resource set may be identified by matching the computing resources specified by the composition request to at least one compute resource set having those resources using a telemetry data map (412, FIG. 4).

For example, the telemetry data map (412, FIG. 4) may specify a list of compute resource sets, identifiers of control resource sets that manage the listed compute resource sets, and the hardware devices of the listed compute resource sets. By matching the computing resources specified by the composition request to the hardware devices specified in the list, the compute resource set corresponding to the listed hardware devices may be identified as the at least one compute resource set.

If no compute resource set includes all of the computing resources specified by the composition request, multiple compute resource sets having sufficient hardware devices to meet the computing resources specified by the composition request may be identified as the at least one compute resource set.

However, the at least one compute resource set may not able to satisfy all of the computing resources specified by the composition request. As discussed above, compute resource sets may only include a limited number and type of hardware devices. Consequently, the at least one compute resource set may not be able to provide some of the computing resources (e.g., graphics processing, communications, etc.) specified by the composition request.

In step 504, at least one hardware resource set having hardware resources specified by the composition request is identified. The at least one hardware resource set may be identified similarly to that described with respect to the identified of the at least one compute resource set of step 504. For example, the computing resources requirements specified by the composition request may be matched to compute resource sets.

In step 506, management services for the at least one compute resource set and the at least one hardware resource set are setup using at least one control resource set. The management services may include, for example, virtualization, emulation, abstraction, indirection, and/or other type of services to meet the requirements of data integrity, security, and/or management models.

The management services may also include monitoring of the utilization of the hardware devices of the at least one compute resource set and the at least one hardware resource set. For example, the utilization monitor hosted by the system control processor of the at least one control resource set may be configured to perform the monitoring of the hardware devices of these sets. Consequently, the system may begin to monitor the use of these hardware devices by a client sent the composition request.

As discussed above, the utilization manager may be monitoring by communicating with the hardware devices of the at least one compute resource set via sideband communication, intercept communications from the at least one computing resource set directed toward the at least one hardware resource set to identify how the hardware devices of the at least compute resource set are using the hardware devices of the at least one hardware resource set, etc. Consequently, the monitored computing resource use may be transparent to entities executing using the at least one compute resource set.

The management services may be setup, in all or in part, via the method illustrated in FIG. 5.2.

In step 508, the managed at least one hardware resources are presented to the managed at least one compute resource set as bare metal resources using the at least one control resource set to instantiate the composed information handling system to service the composition request.

To present the managed at least one hardware resource set, the system control processor manager may instruct the system control processors of the at least control resource set to present the managed at least one hardware resource set as discoverable bare metal resources to the at least one compute resource set. For example, the at least one control resource set may send a bare metal communication to one or more processors of the managed at least one compute resource set to cause the processors to discover the presence of the presented bare metal resources. By doing so, the processors may then begin to utilize the managed at least one hardware resource set as bare metal resources resulting in a composed information handling system having all of the resources necessary to provide desired computer implemented services.

The method may end following step 508.

Using the method illustrated in FIG. 5.1, a composed information handling system may be formed using computing resources from one or more information handling systems and/or external resources in a manner that allows of use of the hardware devices of the composed information handling system to be monitored.

Turning to FIG. 5.2, FIG. 5.2 shows a flowchart of a method in accordance with one or more embodiments of the invention. The method depicted in FIG. 5.2 may be performed to setup management services in accordance with one or more embodiments of the invention. The method shown in FIG. 5.2 may be performed by, for example, a system control processor manager (e.g., 50, FIG. 1.1). Other components of the system in FIG. 1.1 may perform all, or a portion, of the method of FIG. 5.2 without departing from the invention.

While FIG. 5.2 is illustrated as a series of steps, any of the steps may be omitted, performed in a different order, additional steps may be included, and/or any or all of the steps may be performed in a parallel and/or partially overlapping manner without departing from the invention.

In step 510, resource management services for the at least one compute resource set and the at least one hardware resource set are setup.

To setup the resource management services, the system control processor manager may cooperate with the at least one control resource set. For example, the system control processor manager may generate instructions for implementing the management services, encapsulate the instructions in a message, and send the message to one or more system control processors of the at least one control resource set. In response to receiving the message, the system control processors may implement the instructions thereby implementing any number of management services such as virtualization, emulation, etc.

The system control processor manager may also include identification information for the system control processors that will cooperate in presenting resources as part of instantiating a composed information handling system. Consequently, the system control processors of control resource sets that will facilitate bare metal presentation of resources to processors of compute resource sets of the composed information handling system may be able to identify each other, communicate with one another, etc.

Setting up management services for the hardware resource set may include, for example, preparing translation, indirection, or abstraction tables used to translate logical addresses provided by compute resource sets to physical addresses utilized by hardware devices of the hardware resource set.

In another example, setting up management services may include, if the type of the resource allocation is a portion of a virtualized resource, making a call to a virtualization resources manager to allocate the portion of resources from an existing virtualized resource or by instantiating a new virtualized resource and allocating the portion from the new virtualized resource.

In a still further example, if the type of the resource allocation requires an emulated resource, providing management services may include instantiating a corresponding emulation layer between a hardware device of the hardware resource set and the compute resource set. Consequently, bare metal communications between the compute resource set and the hardware device used to present the bare metal resource to the compute resource set may be automatically translated by the system control processor.

Setting up management services may further include modifying the operation of one or more devices to provide, for example, data integrity functionality (e.g., RAID, ECC, etc.), security functionality (e.g., encryption), and/or other functionalities that are transparent to the composed information handling system.

By setting up management services, a managed at least one compute resource set and a managed at least one hardware resource set may be obtained.

In step 512, a utilization monitor that monitors utilization of the at least one compute resource set and the at least one hardware resource set is instantiated.

The utilization monitor may be instantiated by beginning execution of a utilization monitor on a system control processor of the at least one control resource set that manages presentation of the at least one hardware resource set to the at least one control resource set. The utilization monitor may then be configured (e.g., provided an identifier of the composed information handling system and components thereof that will be monitored by it) to monitor the use of computing resources of the composed information handling system, performance of applications by the composed information handling systems, and/or to otherwise obtain quality metric usable to determine whether the computer implemented services provided by the composed information handling system meets client expectations. If a utilization monitor is already executing on the system control processor, the existing instance of the utilization monitor may be configured to monitor the use of computing resources, application performance, etc. of the composed information handling system.

For example, the system control processor manager may generate instructions for beginning execution and/or configuration of the utilization monitor, encapsulate the instructions in a message, and send the message the system control processor. In response to receiving the message, the system control processor may implement the instructions thereby instantiating the utilization monitor and beginning monitoring of the use of the computing resources of the composed information handling system.

The method may end following step 512.

Using the method illustrated in FIG. 5.2, management services for a composed information handling system may be setup that allows for computing resource use information to be collected in a manner that is transparent to entities hosted by the composed information handling system. The aforementioned information may be utilized to identify whether computer implemented services provided by the composed information handling system meets client expectations.

As discussed above, embodiments of the invention may provide for managing deployment of composed information handling systems over time. For example, it may be desirable to add resources to, remove resources from, or otherwise change resources used to provide computer implemented services to better match the provided services to client expectations.

Figure 6:
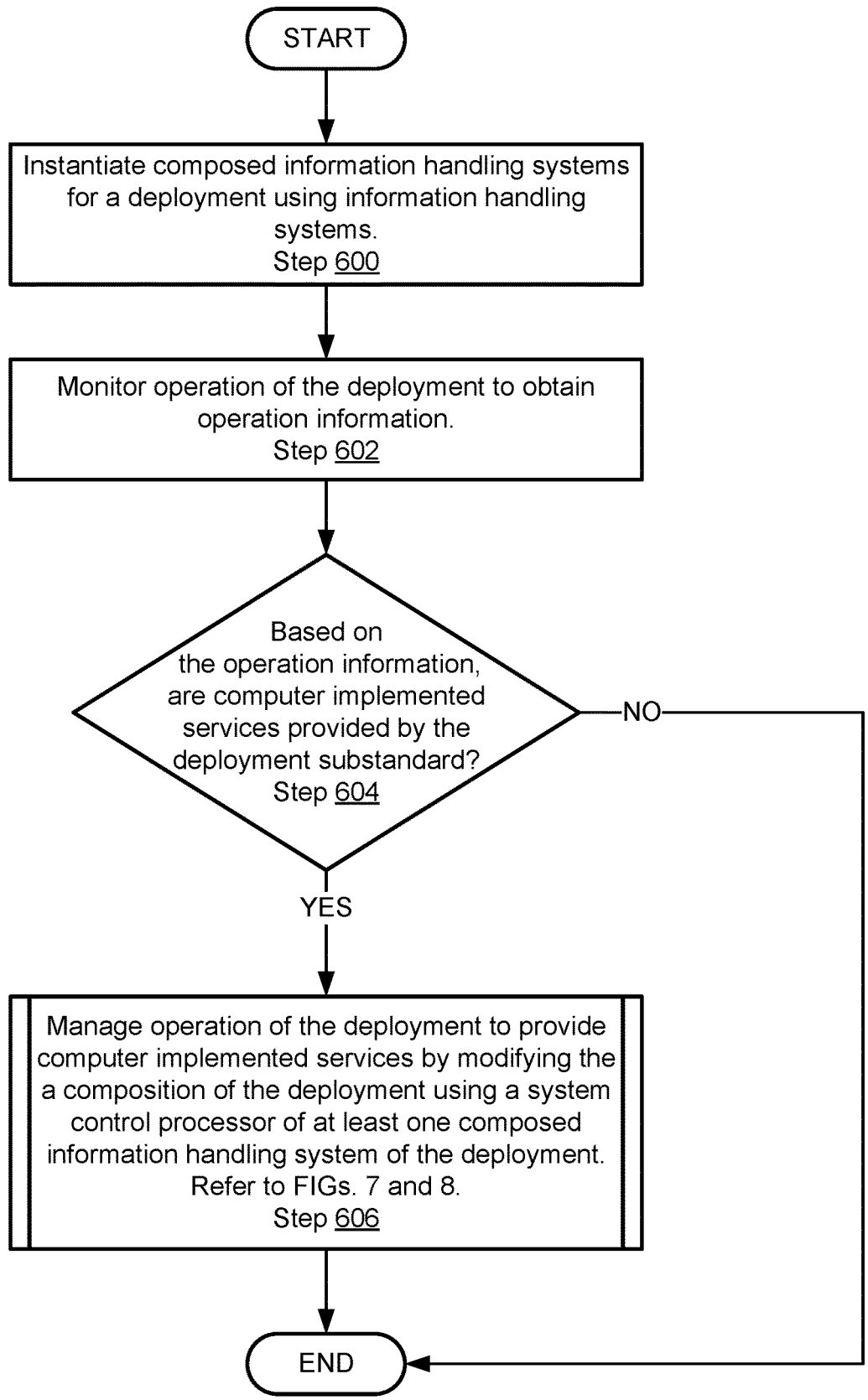
FIG. 6 shows a flowchart of a method of operating a deployment including composed information handling systems in accordance with one or more embodiments of the invention.

Turning to FIG. 6, FIG. 6 shows a flowchart of a method in accordance with one or more embodiments of the invention. The method depicted in FIG. 6 may be performed to manage the operation of a deployment in accordance with one or more embodiments of the invention. The method shown in FIG. 6 may be performed by, for example, a deployment manager (e.g., 404, FIG. 4). Other components of the system of FIG. 1.1 may perform all, or a portion, of the method of FIG. 6 without departing from the invention.

While FIG. 6 is illustrated as a series of steps, any of the steps may be omitted, performed in a different order, additional steps may be included, and/or any or all of the steps may be performed in a parallel and/or partially overlapping manner without departing from the invention.

In step 600, composed information handling systems for a deployment are instantiated using information handling systems. The deployment may provide any number and type of functionalities and may include any number of composed information handling systems.

In one or more embodiments of the invention, the deployment provides computer implemented services using virtual machines. Consequently, the composed information handling systems of the deployment may host a hypervisor and other applications for supporting the operation of the virtual machines. The virtual machines may host any number and types of applications that provide computer implemented services desired by a client.

In one or more embodiments of the invention, the composed information handling systems are instantiated by invoking the functionality of an infrastructure manager by sending one or more composition requests, as described with respect to FIG. 5.1. The composition manager may instantiate the composed information handling systems using the information handling systems in response to the composition requests.

The deployment may be instantiated at the request of a client or another entity.

In step 602, the operation of the deployment is monitored to obtain operation information. The operation information may include any type and quantity of information usable to ascertain whether the computer implemented services provided by the deployment meets client expectations.

The operation information may be obtained from utilization monitors hosted by system control processors of the composed information handling systems of the deployment. For example, the utilization monitors may monitor workloads being performed by the composed information handling systems and report, to a system control processor manager, the workload performance. The performance of any number of composed information handling systems may be obtained when monitoring the operation of the deployment.

In step 604, it is determined, based on the operation information, whether the computer implemented services provided by the deployment are substandard. The determination may be made by comparing the operation information obtained in step 602 to client expectations for the computer implemented services.

For example, the comparison may indicate a variance (e.g., better than expected or worse than expected rather than as expected) between the computer implemented services provided by the deployment and those expected by the client. If a variance exists that exceeds a predetermined amount, then it may be determined that the computer implemented services are substandard. In some embodiments of the invention, the services may only be determined as being substandard if the services are worse than expected by the client.

If it is determined that the computer implemented services provided by the deployment are substandard, the method may proceed to step 606. If it is determined that the computer implemented services are not substandard, then the method may end following step 604.

In step 606, the operation of the deployment is managed to provide computer implemented services by modifying the composition of the deployment using a system control processor of at least one composed information handling system.

For example, the infrastructure manager may send instructions to the system control processor indicating that computing resources should be added to a composed information handling system, computing resources should be removed from a composed information handling system, and/or a new composed information handling system should be instantiated and the workload (all or part) of an existing composed information handing system should be transferred to the newly instantiated composed information handling system. By doing so, the computing resources allocated for providing the computer implemented services may be better matched to those required to provide the quality of computer implemented services requested by a client.

Figure 7:
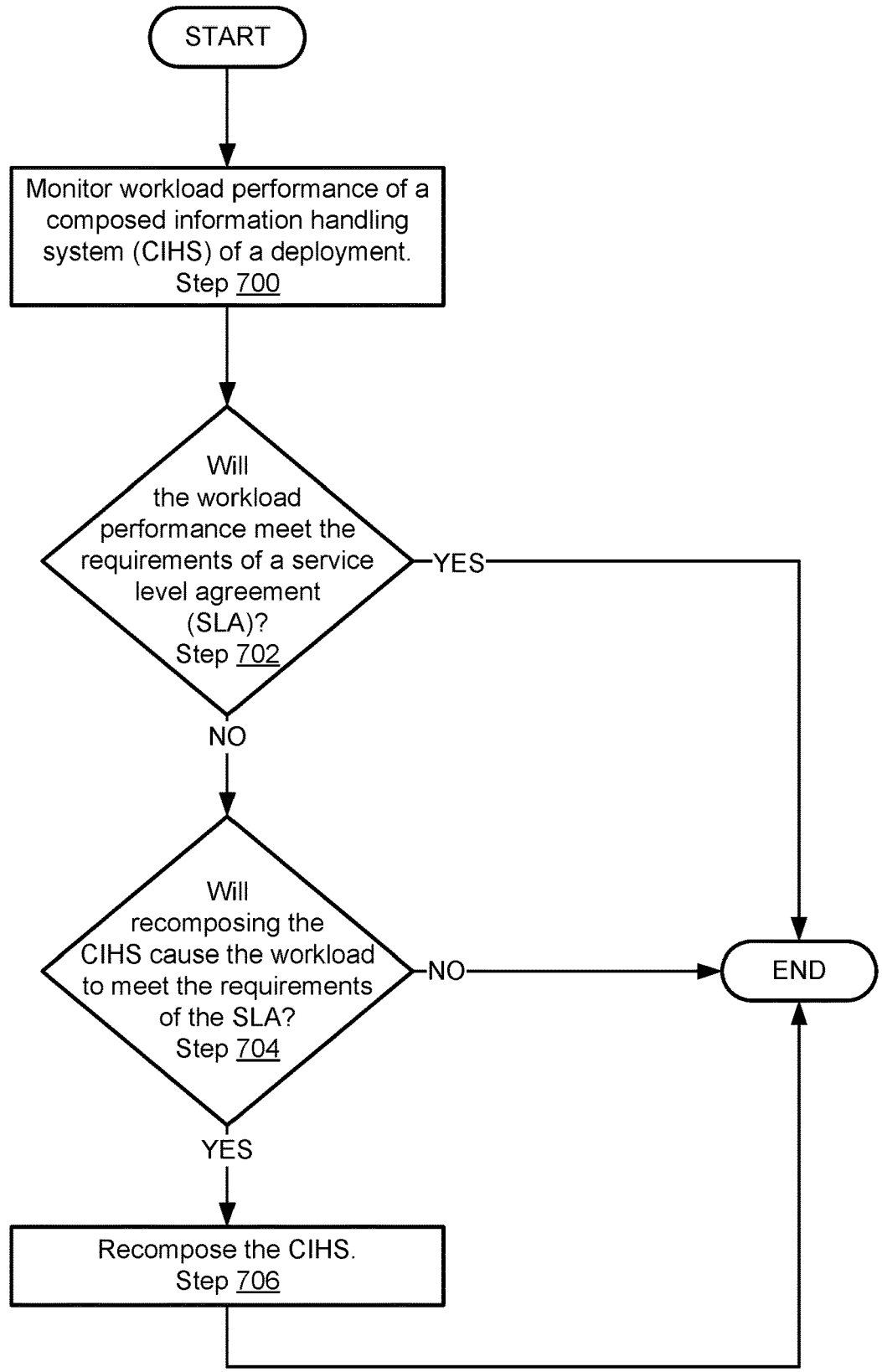
FIG. 7 shows a flowchart of a method of recomposing a composed information handling system in accordance with one or more embodiments of the invention.

In one or more embodiments of the invention, the operation of the deployment is managed using all, or a portion, of the methods illustrated in FIGS. 7 and/or 8.

The method may end following step 606.

Using the methods illustrated in FIG. 606, the operation of a deployment may be managed to match the quantity of computing resources required for providing computer implemented services to those actually required to provide the quality of computer implemented services requested by a client. Consequently, computing resources of the system may be more efficiently allocated while making it likely that the quality of provided computer implemented services matches that expected by clients.

Turning to FIG. 7, FIG. 7 shows a flowchart of a method in accordance with one or more embodiments of the invention. The method depicted in FIG. 7 may be performed to provide computer implemented services using a deployment in accordance with one or more embodiments of the invention. The method shown in FIG. 7 may be performed by, for example, a deployment manager (e.g., 404, FIG. 4). Other components of the system of FIG. 1.1 may perform all, or a portion, of the method of FIG. 7 without departing from the invention.

While FIG. 7 is illustrated as a series of steps, any of the steps may be omitted, performed in a different order, additional steps may be included, and/or any or all of the steps may be performed in a parallel and/or partially overlapping manner without departing from the invention.

In step 700, workload performance of a composed information handling system is monitored. The workload performance may be monitored using a utilization monitor hosted by a system control processor of the composed information handling system. The workload performance may indicate whether computer implemented services being provided by the composed information handling system meet client expectations.

In step 702, it is determined whether the workload performance meets the requirements of a service level agreement. The determination may be made by comparing the characteristics of the workload performance (e.g., response time, completion duration, etc.) to corresponding characteristics specified by the service level agreement.

If the workload performance does not meet the service level agreement, then the method may proceed to step 704. If the workload performance does meet the service level agreement, then the method may end following step 702.

In step 704, it is determined whether recomposing the composed information handling system will cause the workload performance to meet the requirements of the service level agreement.

The determination may be made by estimating a computing resource cost for (i) adding additional resources to the composed information handling system and/or (ii) instantiating a new composed information handling system (which may have different number of computing resources than that which hosts the workload) and transferring the workload to the new composed information handling system. The computing resource cost may be used, in part, to make the determination.

For example, an estimate of the performance of the workload may be made after recomposing the composed information handling system by either (i) adding additional computing resources to it and/or (ii) transferring the workload to a newly composed information handling system. The estimation may take into account the additional and/or differently available computing resources for performing the workload. The performance estimate (e.g., completion time, responsiveness, ability to concurrently perform multiple instances of the workload, scalability, etc.) may then be used to determine whether recomposing the composed information handling system will cause the workload to meet the requirements of the service level agreement.

If it is determined that recomposing the composed information handling system will cause the workload to meet the requirements of the service level agreement, then the method may proceed to step 706. If it is determined that recomposing the composed information handling system will not cause the workload to meet the requirements of the service level agreement, then the method may end following step 704.

In step 706, the composed information handling system is recomposed. The composed information handling system may be recomposed using, for example, a composable asset map (e.g., 420, FIG. 4) that specifies free resources that may be used to recompose composed information handling systems.

The composable asset map may be used to invoke the functionality of the infrastructure manager. For example, instructions based on the composable asset map may be generated and sent to the infrastructure manager. In response, the infrastructure manager may recompose the composed information handling system in accordance with the instructions.

In one or more embodiments of the invention, the composed information handling system is recomposed by adding computing resources it. Consequently, it may be more likely that the computer implemented services provided by the composed information handling system meet the client's expectations.

In one or more embodiments of the invention, the composed information handling system is recomposed by instantiating a new composed information handling system and transferring a workload associated with the workload performance the composed information handling system to the new composed information handling system. The new composed information handling system may have more computing resources than the composed information handling system. Consequently, it may be more likely that the computer implemented services provided by the new composed information handling system meet the client's expectations.

The method may end following step 706.

Using the method illustrated in FIG. 7, a composed information handling system may be recomposed in a manner that may limit consumption of computing resources if the recomposed composed information handling system will be unlikely to provide computer implemented services that meet client expectations.

Figure 8:
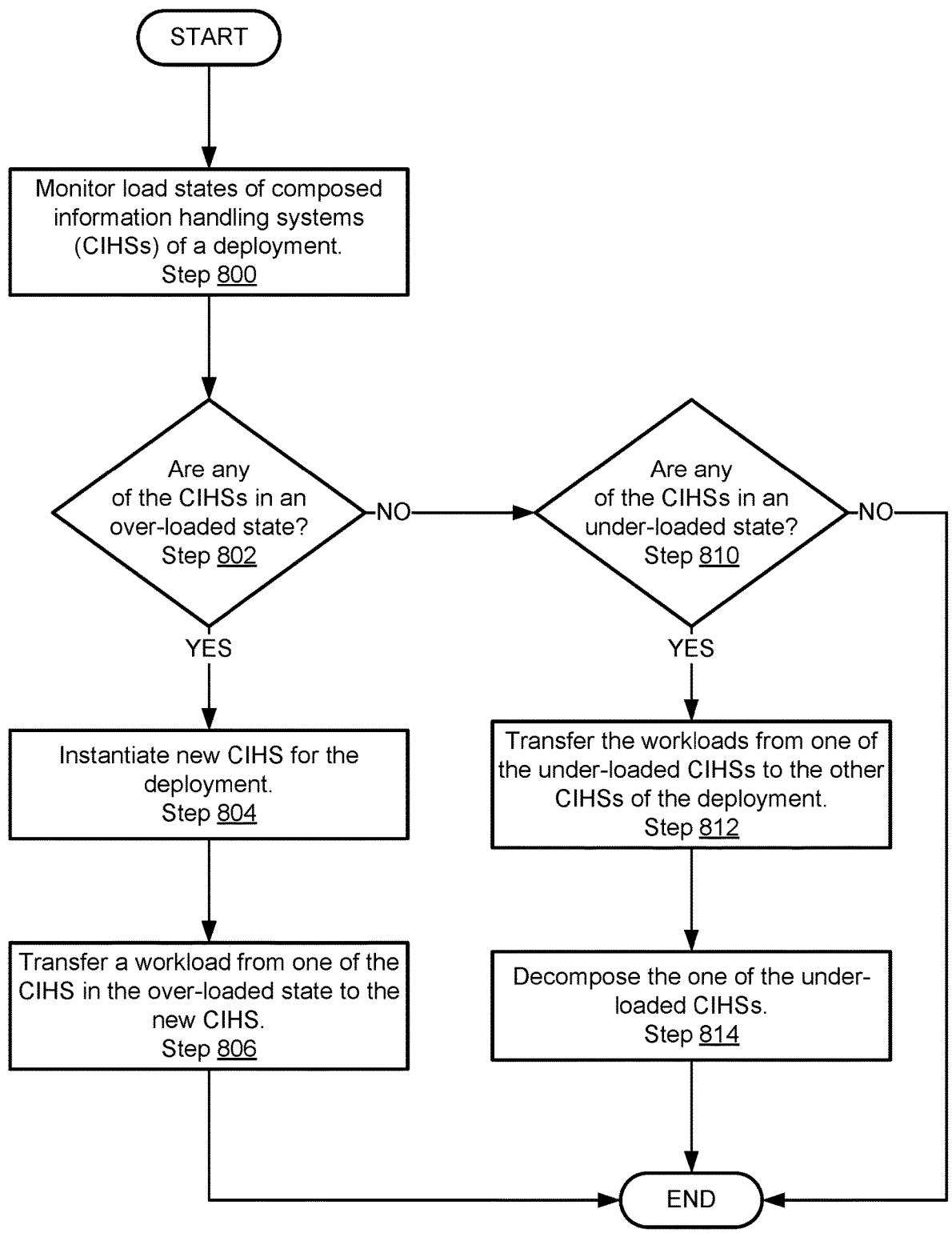
FIG. 8 shows a flowchart of a method of recomposing a deployment including composed information handling systems in accordance with one or more embodiments of the invention.

Turning to FIG. 8, FIG. 8 shows a flowchart of a method in accordance with one or more embodiments of the invention. The method depicted in FIG. 8 may be performed to provide computer implemented services using a deployment having virtualized infrastructure components in accordance with one or more embodiments of the invention. The method shown in FIG. 8 may be performed by, for example, a deployment manager (e.g., 404, FIG. 4). Other components of the system of FIG. 1.1 may perform all, or a portion, of the method of FIG. 8 without departing from the invention.

While FIG. 8 is illustrated as a series of steps, any of the steps may be omitted, performed in a different order, additional steps may be included, and/or any or all of the steps may be performed in a parallel and/or partially overlapping manner without departing from the invention.

In step 800, the load states of composed information handling systems of a deployment are monitored. The composed information handling systems may host components (e.g., hypervisors, virtual machines, virtualized resources, etc.) of virtualized infrastructure. The virtualized infrastructure may be providing computer implemented services. Consequently, there may be computing resource loads being imposed on the composed information handling systems. The load states may reflect whether the composed information handling systems are able to provide computer implemented services in accordance with client expectations.

In step 802, it is determined whether any of the composed information handling systems are in over-loaded states. A composed information handling system may be in an over-loaded load state if it has insufficient computing resources to service all of the resource requested by the components of the virtualized infrastructure that it hosts.

For example, consider a scenario where a composed information handling system hosts 10 virtual machines. At a first point in time, these virtual machines may only utilize 70% of the composed information handling system's computing resources. However, at a second point in time, these virtual machines may request usage of 150% of the composed information handling system's computing resources. Consequently, the composed information handling system may not be able to supply the requested computing resources resulting in reduced performance of computer implemented services provided by the virtual machines thereby placing the composed information handling system in an over-loaded load state.

If it is determined that at least one of the composed information handling systems is in an over-loaded load state, then the method may proceed to step 804. Otherwise, the method may proceed to step 810.

In step 804, a new composed information handling system is instantiated. The new composed information handling system may be instantiated by requesting that an infrastructure manager instantiate the new composed information handling system. In turn, the infrastructure manager may send appropriate instructions to a system control processor, as discussed with respect to FIG. 5.1.

In step 806, a workload from one of the composed information handling systems in the over-loaded load state is transferred to the new composed information handling system.

For example, execution of a virtual machine performing the workload may be suspended and/or quiesced and an image of the virtual machine may be subsequently obtained. The image of the virtual machine may then be loaded on the new composed information handling system. Once loaded, execution of the new virtual machine may be initiated. The workload may be transferred via other method without departing from the invention. For example, a partial virtual machine image may be used to instantiate a new virtual machine on the new composed information handling system, application(s) corresponding to the workload may be loaded, and execution of the application(s) may be initiated to transfer the workload.

The method may end following step 806.

Returning to step 802, the method may proceed to step 810 following step 802 if it is determined that there are any composed information handling systems in an over-loaded load state.

In step 810, it is determined whether any of the composed information handling systems are in an under-loaded load state. A composed information handling system may be in an under-loaded load state if it has more than sufficient computing resources to provide all of the resources requested by the components of the virtualized infrastructure that it hosts.

For example, consider a scenario where a composed information handling system hosts 10 virtual machines. At a first point in time, these virtual machines may utilize 95% of the composed information handling system's computing resources. However, at a second point in time, these virtual machines may request usage of only 20% of the composed information handling system's computing resources. Consequently, the composed information handling system may have ample resources to supply the requested computing resources resulting in underutilized computing resources.

If it is determined that at least one of the composed information handling systems is in an under-loaded load state, then the method may proceed to step 812. Otherwise, the method may end following step 810.

In step 812, the workloads from one of the under-loaded composed information handling systems is transferred different composed information handling systems of the deployment. For example, virtual machines may be transferred as described with respect to step 806 from one of the under-loaded composed information handling systems to other composed information handling systems of the deployment. Consequently, the under-loaded composed information handling system may no longer be contributing to the computer implemented services provided by the deployment.

In step 814, the under-loaded composed information handling system of step 812 is decomposed. To decompose the under-loaded composed information handling system, an appropriate request may be sent to the infrastructure manager. In turn, the infrastructure manager may send corresponding instructions to a system control processor of the under-loaded composed information handling system to terminate execution of the composed information handling system and release the compute resource set(s), hardware resource set(s), and control resource set(s) for allocation to other devices.

The method may end following step 814.

Using the method illustrated in FIG. 8, a system in accordance with embodiments of the invention may recompose deployments including virtualized infrastructure by instantiating and/or decomposing composed information handling systems of the deployment. Consequently, the computing resources utilized for providing computer implemented services by the deployment may be dynamically reallocated to match those required to provide computer implemented services of a quality requested by a client.

Figure 9:
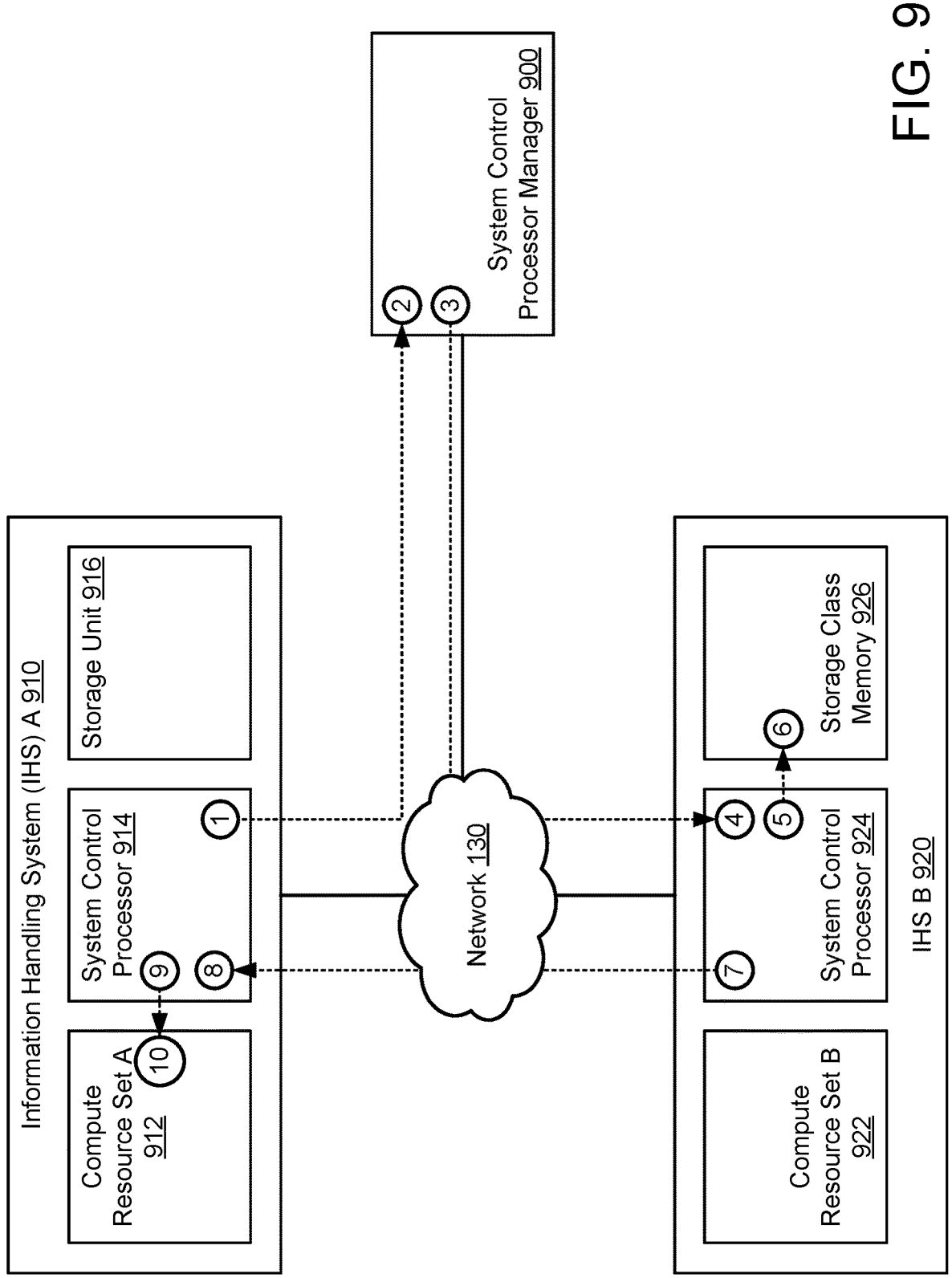
FIG. 9 shows a diagram of the operation of a first example system over time in accordance with one or more embodiments of the invention.

To further clarify embodiments of the invention, two non-limiting examples are provided in FIG. 9 and FIGS. 10.1-10.2, respectively. FIGS. 9-10.2 show a system similar to that illustrated in FIG. 1.1. Actions performed by components of the illustrated system are illustrated by numbered, circular boxes interconnected, in part, using dashed lines terminating in arrows. For the sake of brevity, only a limited number of components of the system of FIG. 1.1 is illustrated in FIGS. 9-10.2.

First Example

Consider a scenario as illustrated in FIG. 9 in which a system control processor manager (900) has instantiated a composed information handling system for a client. The composed information handling system includes resources from a compute resource set A (912), a system control processor (914), and a storage unit (916) of an information handling system A (910). Once instantiated, the composed information handling system begins providing computer implemented services to a client (not shown) by causing an application to execute using a processor and memory of the compute resource set A (912).

Overtime, the client relies more and more on the computer implemented services thereby increasing demand for these services. Consequently, the application hosted by the composed information handling system begins to utilize more and more of the memory of compute resource set A (912) until all of the memory of the composed information handling system is in use.

While this is occurring, at step 1, the system control processor (914) monitors the use of the memory. Based on the monitoring, the system control processor (914) notifies the system control processor manager, in step 2, that the computer implemented services are beginning to suffer due to lack of requested memory resources.

Based on the notification, the system control processor manager (900) determines that the computer implemented services being provided by the composed information handling system no longer meet a service level agreement with the client. Consequently, the system control processor manager (900) determines that additional computing resources, specifically memory, should be allocated to the composed information handling system.

Using a composable asset map, the system control processor manager (900), at step 3, identifies that information handling system B (920) includes free storage class memory (926) for allocation. Accordingly, the system control processor manager (900), at step 4, generates and sends a message to the system control processor (924) of information handling system B (920) requesting that the storage class memory (926) be allocated to the composed information handling system.

In response to receiving the message, the system control processor (924), at step 5, prepares the storage class memory (926) for allocation. Compute resource set B (922) may not be used at this time. At step 6, the system control processor (924) allocates it to the composed information handling system by appropriately updating its utilization map.

Once allocated, the system control processor (924), at step 7, forms a connection with the system control processor (914) of information handling system A (910) via network (130) and notifies, at step 8, the system control processor (914) of the allocation via the connection.

At step 9, the system control processor (914) prepares the storage class memory (926) for allocation by generating appropriate layers of abstraction so that bare metal communications to storage class memory (926) are appropriately forwarded to system control processor (924).

Once prepared, the system control processor (914) presents, as bare metal resources, the abstracted storage class memory (926) to the compute resource set A (912). Consequently, the memory resources available for performing the computer implemented services is improved resulting in the computer implemented services meeting the requirements of the service level agreement.

End of First Example

Thus, as illustrated in FIG. 9, embodiments of the invention may provide for the recomposition of composed information handling systems to meet client expectations.

Second Example

Consider a scenario as illustrated in FIG. 10.1 in which a deployment including two composed information handling systems (1010, 1020) is providing database services to a client. To provide the services, the composed information handling systems (1010, 1020) host four virtual machines (1012, 1014, 1022, 1024). Each of these virtual machines hosts an instance of the database application that provides the database services to a client.

At step 12, the use of the database application hosted by the second virtual machine (1014) greatly increases, which begins to tax the computing resources available to the composed information handling system A (1010). Consequently, the performance of the database services begins to suffer.

At step 13, the composed information handling system A (1010) reports, to a system control processor manager (1000) that the services it provides have degraded for lack of computing resources. In response, the system control processor manager (1000) reviews the computing resources allocated to the deployment and determines that the computer implemented services cannot be remediated by merely transferring the second virtual machine (1014) to the composed information handling system B (1020) because it lacks sufficient computing resources to support execution of the second virtual machine (1014).

In response to this determination, at step 14, the system control processor manager (1000) identifies a portion of unallocated resource sets (1030) that have computing resources sufficient to host the second virtual machine (1014). The system control processor manager (1000) generates and sends instruction to a system control processor of a control resource set of the unallocated resource sets (1030) to form a new composed information handling system.

In step 15, the control resource set presents abstracted hardware resources as bare metal resources to a compute resource set of the unallocated resource sets (1030) to instantiate the new composed information handling system.

Turning to FIG. 10.2, FIG. 10.2 shows a diagram of the system after instantiation of composed information handling system C (1025). At step 18, the system control processor manager (1000) generates and sends instructions to composed information handling system C (1025) to have virtualization and other services begin execution to support transferring the second virtual machine (1014) to composed information handling system C (1025).

In step 19, in response to receiving the instructions, the composed information handling system C (1025) begins execution of an operating system, hypervisor, and/or other entities necessary to support and manage execution of virtual machines.

In step 20, the system control processor manager (1000) generates and sends instructions to the composed information handling system A (1010) instructing it to transfer the second virtual machine (1014) to the composed information handling system C (1025).

In response, at step 21, composed information handling system A (1010) generates an image of the second virtual machine (1014) and terminates local execution of the second virtual machine (1014). At step 22, the composed information handling system A (1010) sends a copy of the image to the composed information handling system C (1025).

At step 23, composed information handling system C (1025) uses the image to initiate local execution of the second virtual machine (1014).

End of Second Example

As illustrated in FIGS. 10.1-10.2, embodiments of the invention may provide a system that enables workloads hosted by virtualized infrastructure to automatically be transferred to new composed information handling systems. By doing so, degradations in computer implemented services may be remediated to meet client expectations.

Figure 11:
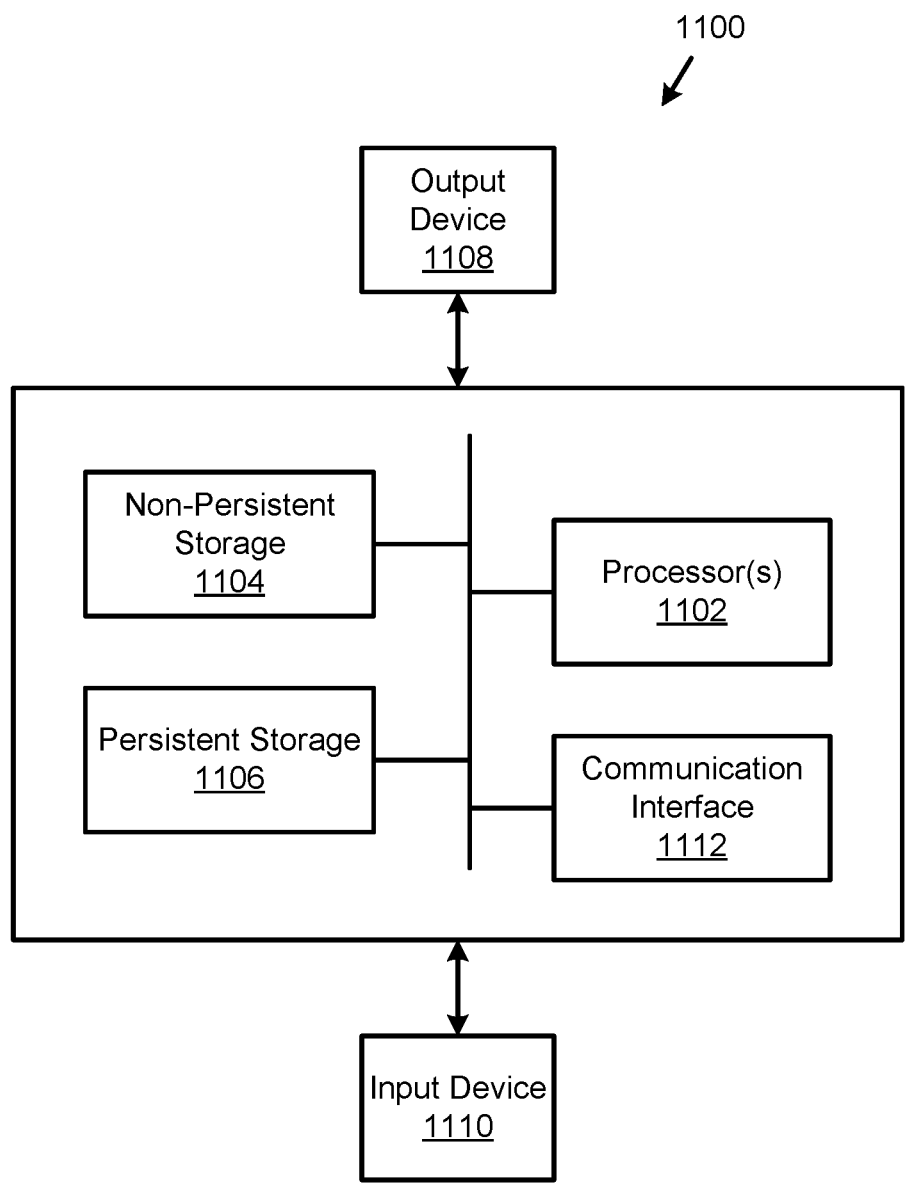
FIG. 11 shows a diagram of a computing device in accordance with one or more embodiments of the invention.

As discussed above, embodiments of the invention may be implemented using computing devices. FIG. 11 shows a diagram of a computing device in accordance with one or more embodiments of the invention. The computing device (1100) may include one or more computer processors (1102), non-persistent storage (1104) (e.g., volatile memory, such as random access memory (RAM), cache memory), persistent storage (1106) (e.g., a hard disk, an optical drive such as a compact disk (CD) drive or digital versatile disk (DVD) drive, a flash memory, etc.), a communication interface (1112) (e.g., Bluetooth interface, infrared interface, network interface, optical interface, etc.), input devices (1110), output devices (1108), and numerous other elements (not shown) and functionalities. Each of these components is described below.

In one embodiment of the invention, the computer processor(s) (1102) may be an integrated circuit for processing instructions. For example, the computer processor(s) may be one or more cores or micro-cores of a processor. The computing device (1100) may also include one or more input devices (1110), such as a touchscreen, keyboard, mouse, microphone, touchpad, electronic pen, or any other type of input device. Further, the communication interface (1112) may include an integrated circuit for connecting the computing device (1100) to a network (not shown) (e.g., a local area network (LAN), a wide area network (WAN) such as the Internet, mobile network, or any other type of network) and/or to another device, such as another computing device.

In one embodiment of the invention, the computing device (1100) may include one or more output devices (1108), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1102), non-persistent storage (1104), and persistent storage (1106). Many different types of computing devices exist, and the aforementioned input and output device(s) may take other forms.

Embodiments of the invention may provide a system and method for dynamically instantiating and recomposing composed information handling systems. Specifically, embodiments of the invention may enable that operation of the composed information handling systems to be monitored. If the monitoring indicates that the services provided by the composed information handling systems are unlikely to meet client expectations, then the system may automatically modify the resources allocated to the composed information handling systems. To do so, the system may add or remove resources to or from existing composed information handling systems. The system may also instantiate new systems having appropriate quantities of allocated resources and transfer workloads to the newly instantiated composed information handling systems. Consequently, changes in computing resource loads on systems may be automatically addressed thereby improving the likelihood that computer implemented services meet client expectations.

Thus, embodiments of the invention may address the problem of limited computing resources in a distributed system. For example, by recomposing composed information handling systems, limited computing resources may be efficiently marshalled to provide desired services that meet service level expectations for those services.

The problems discussed above should be understood as being examples of problems solved by embodiments of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention. Accordingly, the scope of the invention should be limited only by the attached claims.

What is claimed is:

1. A system for providing computer implemented services using information handling systems, comprising:
   persistent storage; and
   a system control processor manager programmed to:
      instantiate composed information handling systems using the information handling systems;
      monitor, using system control processors of the composed information handling systems, operation of the composed information handling systems to obtain operation information;
      make a determination, based on the operation information, that the computing implemented services provided by the composed information handling systems are substandard; and
      in response to the determination:
         manage operation of the composed information handling systems to provide standards compliant computer implemented services by:
            determining a first resource cost for adding computing resources to at least one of the composed information handling systems;
            determining a second resource cost for instantiating a new composed information handling system by:
               computing a computational cost for transferring a workload associated with a workload performance to a new composed information handling system;
               calculating an aggregate computing resource cost of performing the workload on the new composed information handling system and the computational cost; and
               comparing requirements of a service level agreement to a time estimate based on the aggregate computing resource cost; and
            modifying, based on a comparison of the first resource cost and the second resource cost, a composition of at least one of the composed information handling systems using a system control processor of the system control processors.

2. The system of claim 1, wherein the at least one of the composed information handling system comprises a compute resource set, a hardware resource set, and a control resource set comprising the system control processor.

3. The system of claim 2, wherein the control resource set presents abstracted computing resources of the hardware resource set as bare metal resources to the compute resource set.

4. The system of claim 1, wherein managing the operation of the composed information handling systems comprises:
   monitoring the workload performance of the at least one of the composed information handling systems;
   making a second determination that the workload performance will not meet the requirements of the service level agreement;
   in response to the second determination:
      making a third determination that recomposing the at least one of the composed information handling systems will cause the workload performance to meet the requirements of the service level agreement; and
      wherein modifying comprises recomposing the composed information handling system based on the third determination.

5. The system of claim 4, wherein recomposing the composed information handling system comprises:
   making a fourth determination that the first resource cost is less than the second resource cost; and
   adding, based on the fourth determination, computing resources to one of the at least one of the composed information handling systems.

6. The system of claim 4, wherein recomposing the composed information handling system comprises:
   making a fourth determination that the second resource cost is less than the first resource cost"
   instantiating, based on the fourth determination, the new composed information handling system; and
   transferring, based on the fourth determination, a workload associated with the workload performance from one of the at least one composed information handling systems to the new composed information handling system.

7. The system of claim 4, wherein managing the operation of the composed information handling systems further comprises:
   maintaining a listing of free computing resources that may be allocated to form composed information handling systems that are duplicative of the at least one composed information handling systems.

8. The system of claim 1, wherein managing the operation of the composed information handling systems comprises:
   monitoring load states of the composed information handling systems;
   making a second determination, based on the load states, that at least one of the composed information handling systems is in an over-loaded state;
   making a third determination that the second resource cost is less than the first resource cost;
   in response to the second determination and the third determination:
      instantiating the new composed information handling system;
      adding the new composed information handling system to a deployment comprising the composed information handling systems; and
      transferring a workload from the at least one of the composed information handling systems to the new composed information handling system.

9. The system of claim 8, wherein the deployment is a virtualized environment where each of the composed information handling systems host at least one virtual machine.

10. The system of claim 9, wherein transferring the workload comprises:
    suspending execution of the at least one virtual machine hosted by the at least one of the composed information handling systems;

loading an image of the at least one virtual machine on the new composed information handling system; and initiating execution of a new virtual machine based on the image.

11. The system of claim 1, wherein monitoring the operation of the composed information handling systems to obtain operation information comprises:

obtaining, using the system control processors, messages including information specifying the operation of the composed information handling systems.

12. The system of claim 11, wherein no control plane entities hosted by the composed information handling system are aware of the messages.

13. A method for providing computer implemented services using information handling systems, comprising:

instantiating composed information handling systems using the information handling systems;

monitoring, using system control processors of the composed information handling systems, operation of the composed information handling systems to obtain operation information;

making a determination, based on the operation information, that the computing implemented services provided by the composed information handling systems are substandard; and in response to the determination:

managing operation of the composed information handling systems to provide standards compliant computer implemented services by;

determining a first resource cost for adding computing resources to at least one of the composed information handling systems;

determining a second resource cost for instantiating a new composed information handling system by:

computing a computational cost for transferring a workload associated with a workload performance to a new composed information handling system;

calculating an aggregate computing resource cost of performing the workload on the new composed information handling system and the computational cost; and comparing requirements of a service level agreement to a time estimate based on the aggregate computing resource cost; and modifying, based on a comparison of the first resource cost and the second resource cost, a composition of at least one of the composed information handling systems using a system control processor of the system control processors.

14. The method of claim 13, wherein the at least one composed information handling system comprises a compute resource set, a hardware resource set, and a control resource set comprising the system control processor.

15. The method of claim 14, wherein the control resource set presents abstracted computing resources of the hardware resource set as bare metal resources to the compute resource set.

16. A non-transitory computer readable medium comprising computer readable program code, which when executed by a computer processor enables the computer processor to perform a method for providing computer implemented services using information handling systems, the method comprising:

instantiating composed information handling systems using the information handling systems;

monitoring, using system control processors of the composed information handling systems, operation of the composed information handling systems to obtain operation information;

making a determination, based on the operation information, that the computing implemented services provided by the composed information handling systems are substandard; and in response to the determination:

managing operation of the composed information handling systems to provide standards compliant computer implemented services by:

determining a first resource cost for adding computing resources to at least one of the composed information handling systems;

determining a second resource cost for instantiating a new composed information handling system by:

computing a computational cost for transferring a workload associated with a workload performance to a new composed information handling system;

calculating an aggregate computing resource cost of performing the workload on the new composed information handling system and the computational cost; and comparing requirements of a service level agreement to a time estimate based on the aggregate computing resource cost; and modifying, based on a comparison of the first resource cost and the second resource cost, a composition of at least one of the composed information handling systems using a system control processor of the system control processors.

17. The non-transitory computer readable medium of claim 16, wherein the at least one composed information handling system comprises a compute resource set, a hardware resource set, and a control resource set comprising the system control processor.

18. The non-transitory computer readable medium of claim 17, wherein the control resource set presents abstracted computing resources of the hardware resource set as bare metal resources to the compute resource set.

* * * * *